(12) United States Patent
Petersen

(10) Patent No.: US 6,396,811 B1
(45) Date of Patent: May 28, 2002

(54) SEGMENTED PERFORMANCE MONITORING OF MULTI-STAGE ATM NODE

(75) Inventor: Lars-Göran Petersen, Tumba (SE)

(73) Assignee: Telefonaktiebolaget LM Ericsson (SE)

( * ) Notice: Subject to any disclaimer, the term of this patent is extended or adjusted under 35 U.S.C. 154(b) by 0 days.

(21) Appl. No.: 09/213,898

(22) Filed: Dec. 17, 1998

(51) Int. Cl.$^7$ .............................................. G01R 31/08
(52) U.S. Cl. .................... 370/250; 370/395.2
(58) Field of Search ................................ 370/216–218, 370/236.1, 236.2, 241, 241.1, 242, 244, 248, 250, 252, 389, 395.1, 395.2, 395.21, 395.3; 709/223, 224

(56) References Cited

U.S. PATENT DOCUMENTS

| | | |
|---|---|---|
| 5,303,232 A | 4/1994 | Proctor et al. |
| 5,313,453 A | 5/1994 | Uchida et al. |
| 5,432,777 A | 7/1995 | Le Boudec et al. |
| 5,440,547 A | 8/1995 | Easki et al. |
| 5,467,347 A | 11/1995 | Petersen |
| 5,500,851 A | 3/1996 | Kozaki et al. |
| 5,506,841 A | 4/1996 | Sandquist |
| 5,563,874 A | 10/1996 | Kant |
| 5,579,480 A | 11/1996 | Cidon et al. |
| 5,600,632 A | 2/1997 | Schulman |
| 5,640,512 A | 6/1997 | Czerwiec |
| 5,661,722 A | 8/1997 | Miyagi |
| 5,724,354 A | 3/1998 | Tremel et al. |
| 5,737,334 A | 4/1998 | Prince et al. |
| 5,751,951 A * | 5/1998 | Osborne et al. ............ 709/250 |
| 5,764,626 A | 6/1998 | VanDervort |
| 6,229,789 B1 * | 5/2001 | Simpson et al. ............ 370/235 |

FOREIGN PATENT DOCUMENTS

EP        0 671 832 A2        9/1995

OTHER PUBLICATIONS

Kempainen, "ATM Switch Chips Switch on Net Reliability", EDN Electrical Design News, Cahners Publishing Co., Newton, Massachusetts, vol. 42, No. 14, pp. 89–90, 92, 96–98.

Itoh et al., "Function Test Methods Using Test Cells for ATM Switching Systems", Proceedings of the Conference on Communications (ICC), New York, IEEE, pp. 982–987.

Uyless Black, "Emerging Communications Technologies", Second Edition, Prentice Hall Series in Advanced Communications Technologies, 1997, pp. 215–219.

* cited by examiner

*Primary Examiner*—David R. Vincent
(74) *Attorney, Agent, or Firm*—Nixon & Vanderhye, P.C.

(57) ABSTRACT

A multi-stage ATM node (20) comprises plural ATM switches (22) connected together in cascading fashion. A tagging unit (BP/TU) appends a tag (82) to a cell which is to be routed through the ATM node. The tag comprises, e.g., a transfer list (88) of destination addresses for switching of the cell through the ATM node. For monitoring purposes, a node performance monitoring manager (60) defines one or more segments of monitored cell travel through the plural ATM switches of the ATM node, and then selectively starts and stops monitoring with respect to the defined segment. A terminating monitoring unit at a terminating end of the segment uses the tag of a received cell to determine whether the received cell is subject to performance monitoring, and also prepares a termination unit report. The node performance monitoring manager further causes generation of monitoring management cells which also bear a tag, including a monitoring activation cell; a response cell; and a monitoring result cell. The monitoring result cell includes monitoring data. Selective starting and stopping of monitoring over a defined segment is facilitated by additional monitoring management cells which have either a start code or a stop code included in their tags.

65 Claims, 16 Drawing Sheets

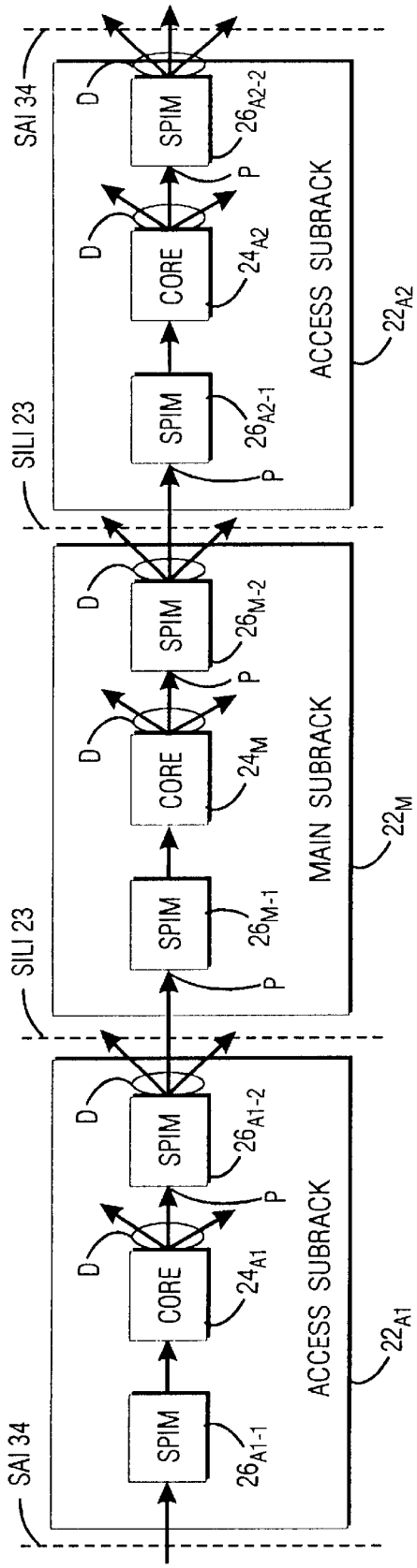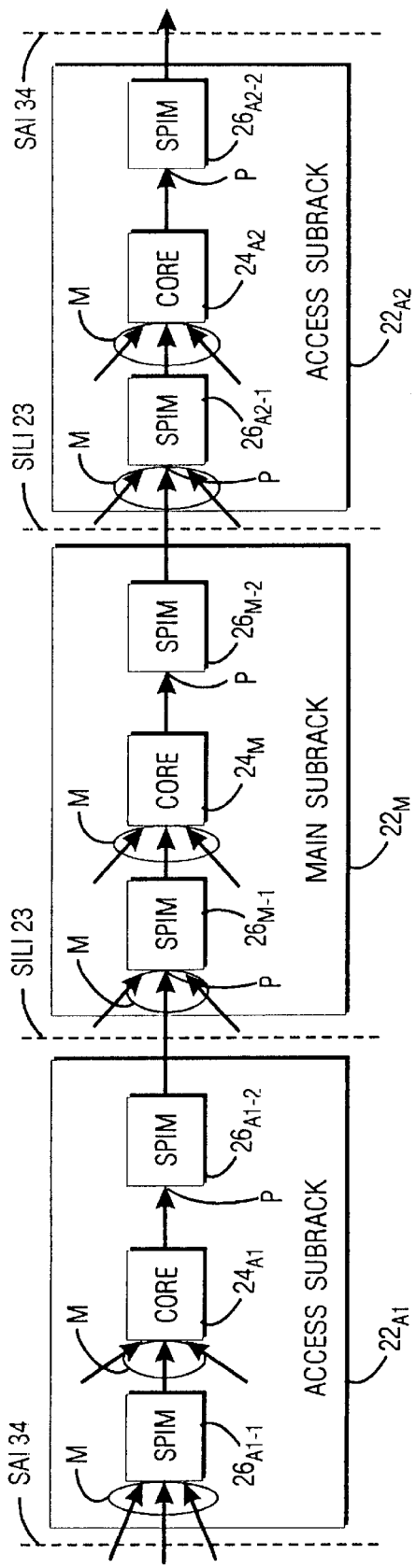

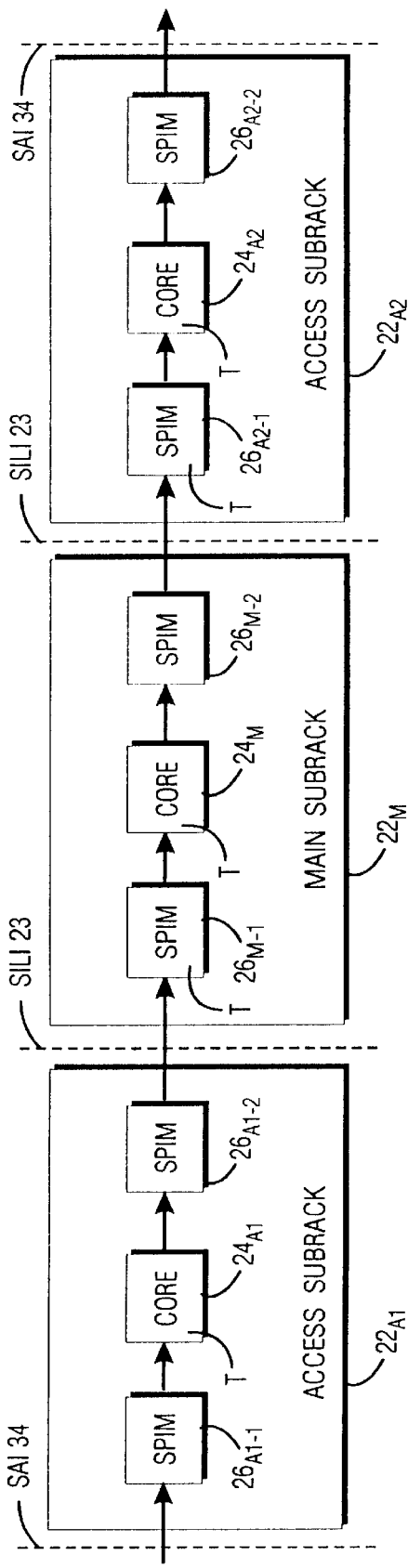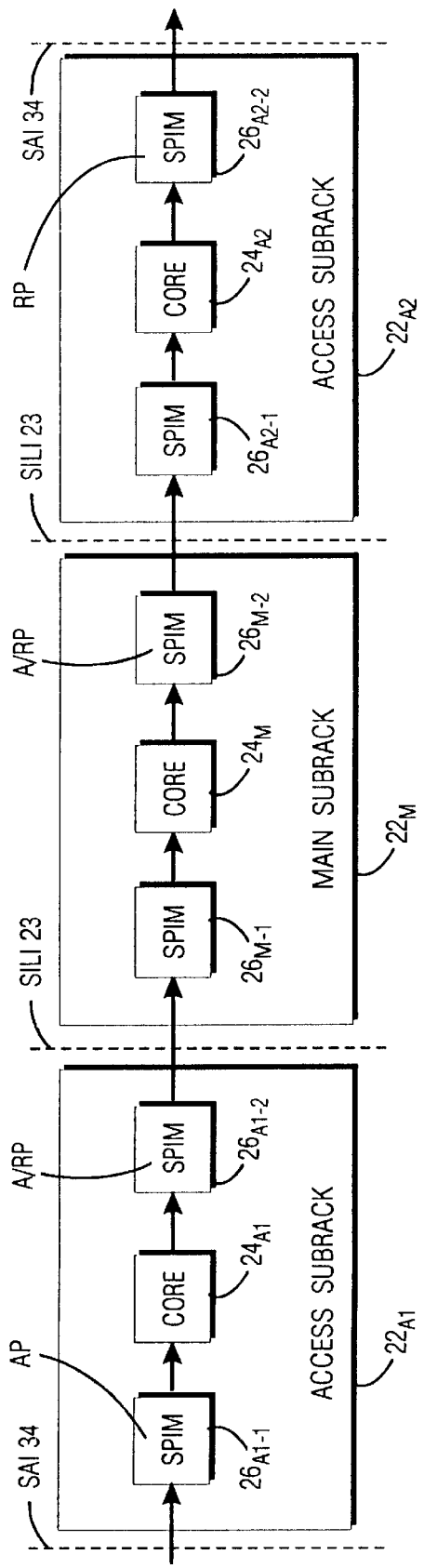
Fig. 5C
Fig. 5E

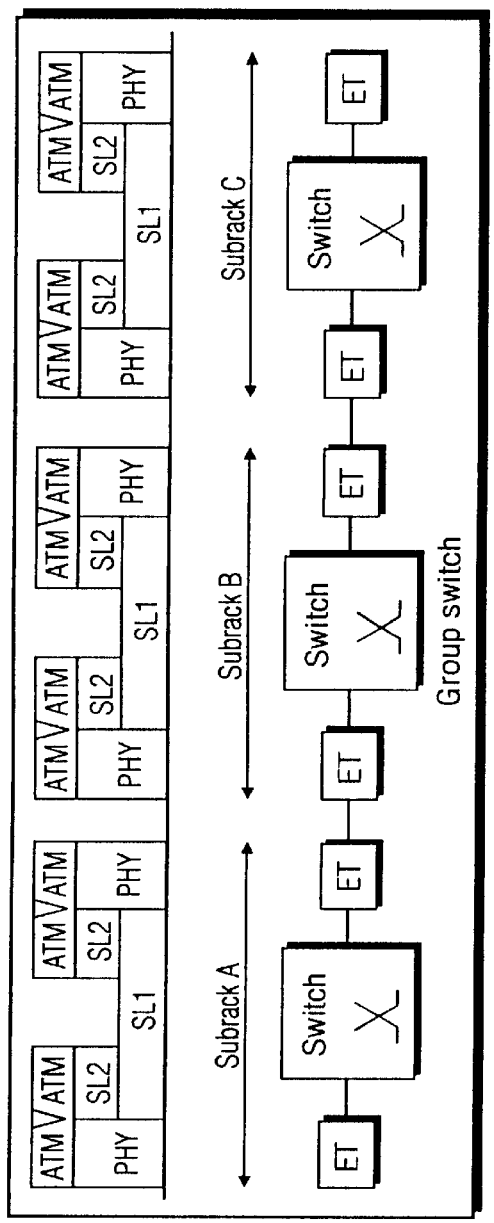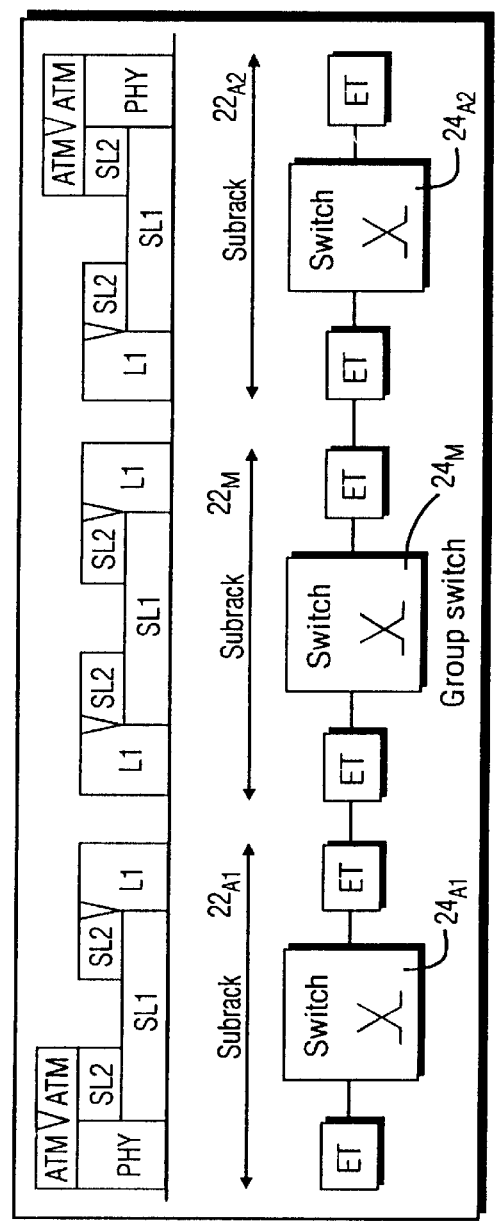
Fig. 10A
Fig. 10B

Fig. 13A

| type =0 | QoS=0 (2 bits) | cell size=8 (60 octets SPAS-cells) | odd parity |
|---|---|---|---|
| format =0 | | substage 1 phys dest. addr=0 | odd parity |
| format =0 | | stage 2 phys dest. addr=1 | odd parity |
| format =0 | type =1 | ring dest. addr=2 | odd parity |
| L=0 | SEQ =0 | ring source address=0 | odd parity |
| format =0 | | substage 5 phys dest. addr=5 | odd parity |
| format =0 | | substage 6 phys dest. addr=4 | odd parity |
| | | SPAS payload | |

$O_1$ → format=0 substage 1; $O_2$ → stage 2; $O_3$ → ring dest addr=2; $O_4$ → L=0 SEQ; $O_5$ → substage 5; $O_6$ → substage 6. — 82A

Fig. 13B

| type =0 | QoS=0 (2 bits) | cell size=8 (60 octets SPAS-cells) | odd parity |
|---|---|---|---|
| format =0 | | substage 2 phys dest. addr=1 | odd parity |
| format =1 | type =1 | ring dest. addr=2 | odd parity |
| L=0 | SEQ =0 | ring source address=0 | odd parity |
| format =0 | | substage 5 phys dest. addr=5 | odd parity |
| format =0 | | substage 6 phys dest. addr=4 | odd parity |
| format =0 | | substage 1 phys source addr=2 | even parity |
| | | SPAS payload | |

| type =0 | QoS=0 (2 bits) | cell size=8 (60 octets SPAS-cells) | odd parity |
|---|---|---|---|
| format =1 | type =1 | ring dest. addr=2 | odd parity |
| L=0 | SEQ =0 | ring source address=0 | odd parity |
| format =0 | | substage 5 phys dest. addr=5 | odd parity |
| format =0 | | substage 6 phys dest. addr=4 | odd parity |
| format =0 | | substage 1 phys source addr=2 | even parity |
| format =0 | | substage 2 phys source. addr=1 | even parity |
| | | SPAS payload | |

| type =0 | QoS=0 (2 bits) | cell size=8 (60 octets SPAS-cells) | odd parity |
|---|---|---|---|
| format =0 | | substage 5 phys dest. addr=5 | odd parity |
| format =0 | | substage 6 phys dest. addr=4 | odd parity |
| format =0 | | substage 1 phys source addr=2 | even parity |
| format =0 | | substage 2 phys dest. addr=1 | even parity |
| format =1 | type =1 | ring dest. addr=2 | even parity |
| L=0 | SEQ =0 | ring source address=0 | even parity |
| | | SPAS payload | |

→ 05, 06, 01, 02, 03, 04 — 82D

SEGMENTED PERFORMANCE MONITORING OF MULTI-STAGE ATM NODE

This application is related to U.S. patent application Ser. No. 09/213,897 filed simultaneously herewith, entitled "INTERNAL ROUTING THROUGH MULTI-STAGED ATM NODE", and incorporated by reference herein.

BACKGROUND

1. Field of the Invention

The present invention pertains to the packet technology known as Asynchronous Transfer Mode (ATM), and particularly to a monitoring technique for a multi-staged ATM node.

2. Related Art and Other Considerations

The increasing interest for high band services such as multimedia applications, video on demand, video telephone, and teleconferencing has motivated development of the Broadband Integrated Service Digital Network (B-ISDN). B-ISDN is based on a technology know as Asynchronous Transfer Mode (ATM), and offers considerable extension of telecommunications capabilities.

ATM is a packet-oriented transfer mode which uses asynchronous time division multiplexing techniques. Packets are called cells and traditionally have a fixed size. A traditional ATM cell comprises 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual is a principal path defined between two switching nodes of the network; the virtual channel is one specific connection on the respective principal path.

At its termination points, an ATM network is connected to terminal equipment, e.g., ATM network users. Typically between ATM network termination points there are plural switching nodes, the switching nodes having ports which are connected together by physical transmission paths or links. Thus, in traveling from an originating terminal equipment to a destination terminal equipment, ATM cells forming a message may travel through several switching nodes.

A switching node has a plurality of ports, each of which can be connected a link circuit and a link to another node. The link circuit performs packaging of the cells according to the particular protocol in use on the link. A cell incoming to a switching node may enter the switching node at a first port and exit from a second port via a link circuit onto a link connected to another node. Each link can carry cells for plural connections, a connection being e.g., a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a message ultimately to travel from an ingress side of the switch to an egress side of the switch, and ultimately from the originating terminal equipment to the destination terminal equipment.

U.S. Pat. No. 5,467,347 to Petersen discloses an ATM switch in which various types of ATM cells are transmitted between a switch core and ports of the switch. The types of cells include traffic cells, operation and maintenance (OAM) cells, and idle cells.

In general, there are two types of errors that can occur in digital hardware (e.g., an ATM link): hard errors and soft errors. A soft error is intermittent and can seem to disappear after some time. Soft errors often occur during bad conditions or when a link is about ready to break down. A user traversing data through a connection suffering soft errors will see a higher, and mostly unacceptable, bit error rate (BER). It is often quite tricky to find soft errors, since it is usually not sufficient merely to send a short stream of test data through the connection. To detect one bit fault can require much time, although it is usually not acceptable to occupy the connection for test purposes for such a long duration.

Performance monitoring to handle soft errors in links external to an ATM node has been proposed, for example, in ITU-T Recommendation I.610, entitled "The Principles of Operation and Maintenance Functions of Broadband ISDN". However, there are no standards developed for monitoring connections inside ATM switch fabrics, and it is doubtful that ATM switch manufacturers have much monitoring inside ATM switch fabrics. However, when ATM switches are employed for complex applications such as for a radio network controller of a mobile telecommunications system, for example, which potentially serves hundreds of thousands of connections, performance monitoring is imperative.

For such complex applications, for example, the inventor of the present invention envisions multi-staged ATM nodes comprising two or more ATM switches. What is needed in such nodes, and an object of the present invention, is a technique for selective monitoring ATM segments between interfaces in such nodes.

BRIEF SUMMARY OF THE INVENTION

A multi-stage ATM node comprises plural ATM switches connected together in cascading fashion. A connection setup manager appends a tag to cells which are to be routed through the ATM node. The tag comprises, e.g., a transfer list of destination addresses for routing of the cell through the ATM node. In one embodiment, each of the plural ATM switches has a switch core situated between two switch port interface modules.

For monitoring purposes, a node performance monitoring manager, acting through an originating monitoring unit, defines one or more segments of monitored cell travel through the plural ATM switches of the ATM node, and then selectively activates and deactivates monitoring with respect to the defined segment. A segment can be, for example, a path through the node from a switch port interface module of a first ATM switch to a switch port interface module of a second ATM switch. A terminating monitoring unit at a terminating end of the segment uses the tag of a received cell to determine whether the received cell is subject to performance monitoring, and also prepares a termination unit report regarding cells which are subject to performance monitoring.

For establishing a monitoring segment, the node performance manager generates monitoring management cells, also known as monitoring control cells or control cells. The monitoring management cells also have a tag with a transfer list. The monitoring management cells involved in establishing a monitoring segment are of three types. A first type of such monitoring management cell is a monitoring activation cell which is sent from the originating end of the segment to notify the terminating end that performance monitoring has been activated. The monitoring activation cell specifies, in a data field in its payload, a transfer list which is to be used for setting up the performance monitoring operation as well as an indication of a certain quality of service involved in the performance monitoring. A second of the monitoring management cells is a response cell which is sent from the terminating end of the segment to confirm to the originating end that the terminating end is ready for performance monitoring. A third of the of the monitoring management cells is a monitoring result cell which is sent from the terminating end of the segment to the originating end and which includes monitoring data. The monitoring data can be any conventional diagnostic monitoring information, such as cell count and total checksum, for example.

The node performance monitoring manager also causes generation of monitoring management cells for the purpose of indicating whether monitoring is to start or stop with respect to an already-established segment so that selective blocks of cells can be monitored. These "start" and "stop" monitoring management cells also include a tag, with the tag bearing a code indicating whether the monitoring management cell starts or stops the monitoring on the segment. Upon receipt at the originating monitoring unit of the monitoring data which comprises the termination unit report prepared by the terminating monitoring unit, the originating monitoring unit performs an analysis and forwards the analysis results to the node performance monitoring manager. The node performance monitoring manager thereby obtains performance monitoring information with respect to each of the selected segments of the multi-staged ATM node.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5A is a schematic view showing demultiplexing points in the multi-stage ATM node as depicted in FIG. 5.

FIG. 5B is a schematic view showing multiplexing points in the multi-stage ATM node as depicted in FIG. 5.

FIG. 5C is a schematic view showing translation points in the multi-stage ATM node as depicted in FIG. 5.

FIG. 5E is a schematic view showing activation and deactivation points in the multi-stage ATM node as depicted in FIG. 5.

FIG. 10A is a diagrammatic routing depicting an alternative internal routing technique through a multi-stage ATM cell;

FIG. 10B is a diagrammatic routing depicting internal routing technique through a multi-stage ATM cell in accordance with a mode of the present invention.

FIG. 13A through FIG. 13F are diagrammatic views showing a SPAS tag according to the invention at different points of travel through the ringed multi-stage ATM node of FIG. 11.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
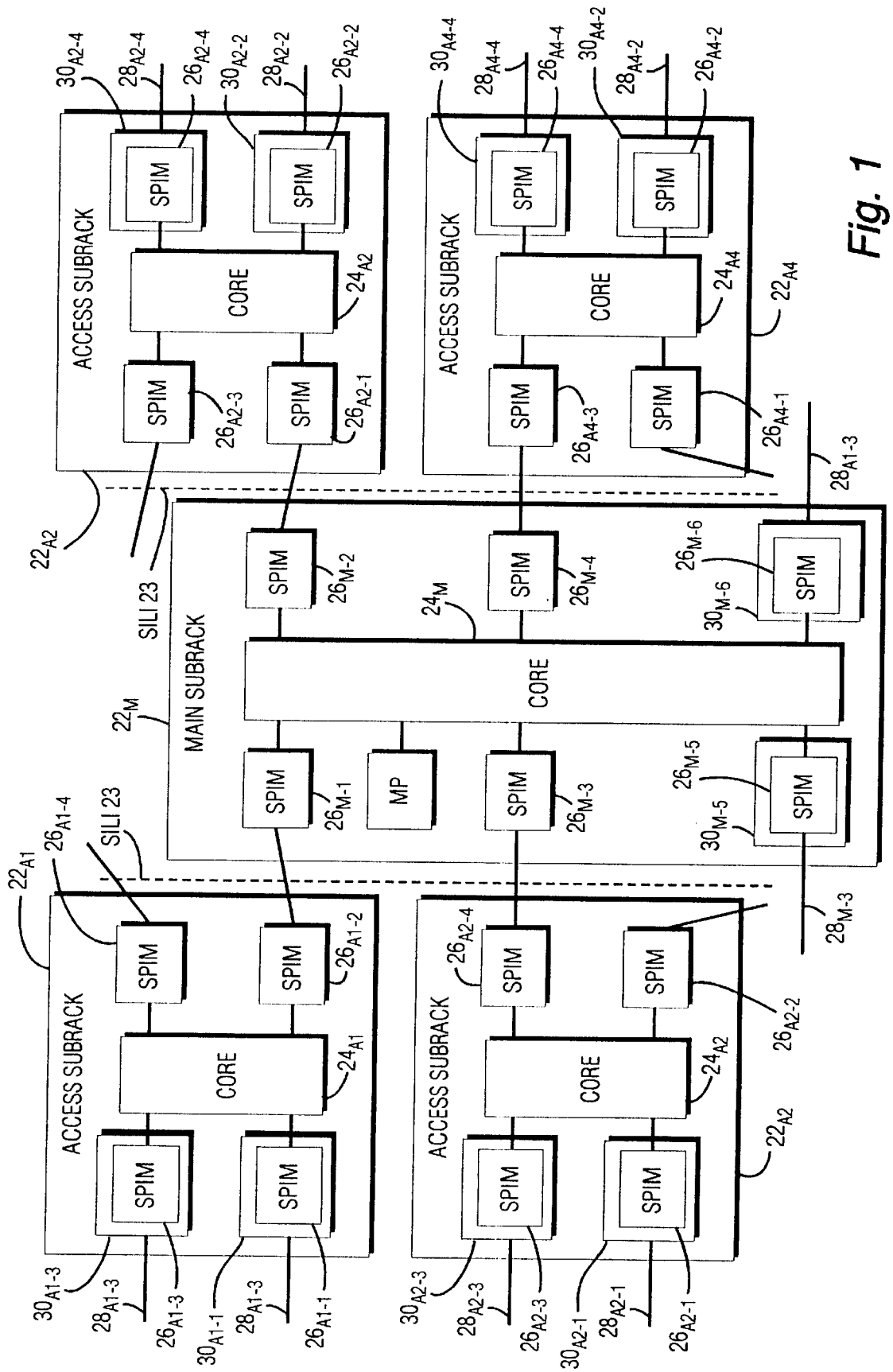
FIG. 1 is a schematic view of portions of a multi-stage ATM node according to an example embodiment of the invention, particularly access subracks and a main rack thereof.

FIG. 1 shows portions of a multi-stage ATM node 20 according to an example embodiment of the invention. In the particular example shown in FIG. 1, multi-stage ATM node 20 is situated in a rack or cabinet of electronic components, the rack comprising plural subracks. For sake of simplification, only five subracks 22 of multi-stage ATM node 20 are shown in FIG. 1, particularly one main subrack $22_M$ and four access subracks $22_{A1}$ through $22_{A4}$. Space switching components of multi-stage ATM node 20 are hereinafter collectively referred to as "SPAS". The interface between subracks 22 is known as the SILI (SPAS Internal Link Interface) interface 23. Cells which are transmitted through the SPAS are referenced herein as "SPAS cells", and (as hereinafter described) can include both SPAS traffic cells and SPAS performance monitoring control cells (also known as monitoring management cells, SPAS controls cells, or simply control cells).

Each subrack is said to have components comprising an ATM switch mounted thereon. As explained in more detail hereinafter, each subrack 22 comprises a ATM switch core 24. Each switch core 24 has a plurality of switch core ports, particularly a plurality of switch core ingress ports as well as a plurality of switch core egress ports. Each of the switch core ports is connected by an intra-subrack link to a switch port interface module (SPIM) 26. An example of communications between a switch core and switch port interface modules is found in U.S. patent application Ser. No. 09/188, 265, filed Nov. 9, 1998 for "Asynchronous Transfer Mode Switch", which is incorporated herein by reference. Those of the switch port interface modules (SPIM) 26 of access subracks $22_A$ which are connected to inter-node (e.g., external) links 28 reside on device boards 30.

For illustrative purposes, each of the subracks 22 of multi-stage ATM node 20 is shown has having two switch port interface modules (SPIM) $26_A$ on an ingress side of switch core $24_A$ and two switch port interface modules (SPIM) $26_A$ on an egress side. For example, for subrack $22_{A1}$ there are provided a first set of switch port interface modules or units (SPIM) $26_{A1-1}$ and $26_{A1-3}$ on device boards $30_{A1-1}$ and $30_{A1-3}$, respectively, on ingress side of switch core $24_{A1}$. A second set of switch port interface modules or units (SPIM) $26_{A1-2}$ and $26_{A1-4}$ are provided on egress side of switch core $24_{A1}$. The switch port interface module (SPIM) $26_{A1-4}$ is connected to another (unillustrated) subrack 22 of multi-stage ATM node 20. The switch port interface module (SPIM) $26_{A1-2}$ is connected to main subrack $22_M$, and particularly to switch port interface module (SPIM) $26_{M-1}$ thereof In FIG. 1, for convenience the other access subracks $22_A$ are shown with comparably referenced components. However, it should be understood that the access subracks $22_A$ do not need to have identical architectures, but that differing numbers of switch port interface modules (SPIM) 26 can be provided thereon and that such switch port interface modules (SPIM) 26 can be connected differently than shown.

Figure 3:
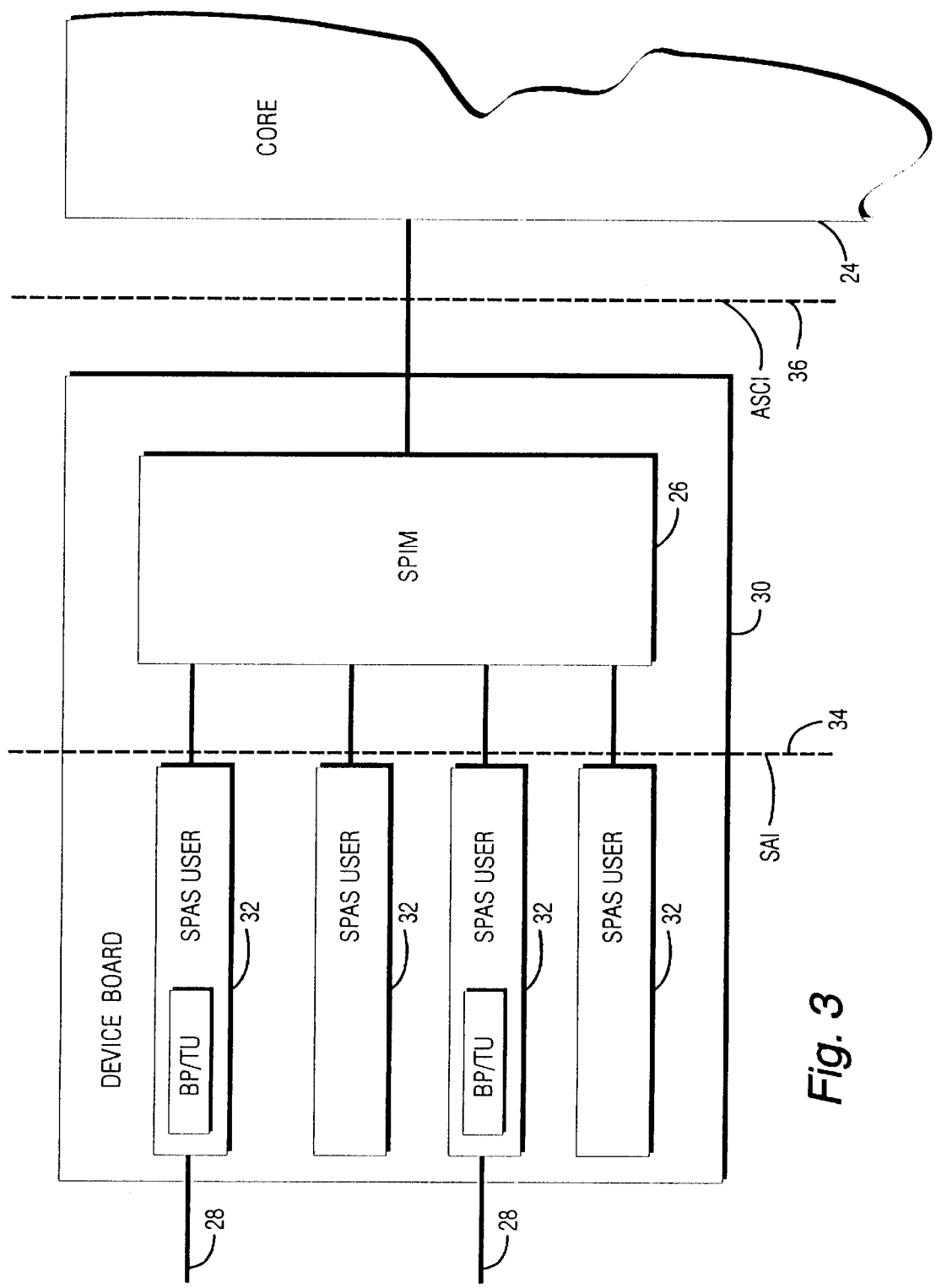
FIG. 3 is a schematic view showing an example device board upon which a switch port interface module (SPIM) of the ATM node of FIG. 1 can reside.

As mentioned above, switch port interface modules (SPIM) 26 serving external links 28 reside, in the illustrated embodiment, on device boards 30. An example device board 30 is illustrated in FIG. 3. As shown in FIG. 3, the device board 30 comprises not only the switch port interface module (SPIM) 26, but one or more SPAS user resources 32. In the particular embodiment shown in FIG. 3, four such SPAS user resources 32 are illustrated. A SPAS user resource 32 can be, for example, a microprocessor, a digital signal processor, ATM or AAL terminating components, or an extension terminal (ET). Extension terminals (ETs) are particularly used for connecting (via an external link 28) multi-stage ATM node 20 to another ATM node in a multi-node network. For functions such as conversion operations and performance monitoring operations hereinafter described, the exchange terminals typically have processors (known as "board processors" or "BPs") mounted thereon. As hereinafter explained, in accordance with the present invention the board processors on device boards 30 at an edge of multi-stage ATM node 20 also function as tagging units, for which reason the board processor/tagging units of FIG. 3 are referenced as BP/TU.

Each of the SPAS user resources 32 connects to the switch port interface module (SPIM) 26 of the device board 30 over a SAI (SPAS Access Interface) interface 34. The switch port interface module (SPIM) 26 includes both hardware and software, and has various components including buffers. Example switch port interface modules (SPIM) 26 are illustrated, for example, in the following United States Patent applications (all of which are incorporated herein by reference): U.S. patent application Ser. No. 08/893,507 for "Augmentation of ATM Cell With Buffering Data"; U.S. patent application Ser. No. 08/893,677 for "Buffering of Point-to-Point and/or Point-to-Multipoint ATM Cells"and U.S. patent aplication Ser. No. 08/893,479 for "VP/VC Look-Up Funtion". The switch port interface module (SPIM) 26 is connected to the switch core 24 of the subrack 22 by ASCI (ATM Switch Core Interface) interface 36.

Figure 2:
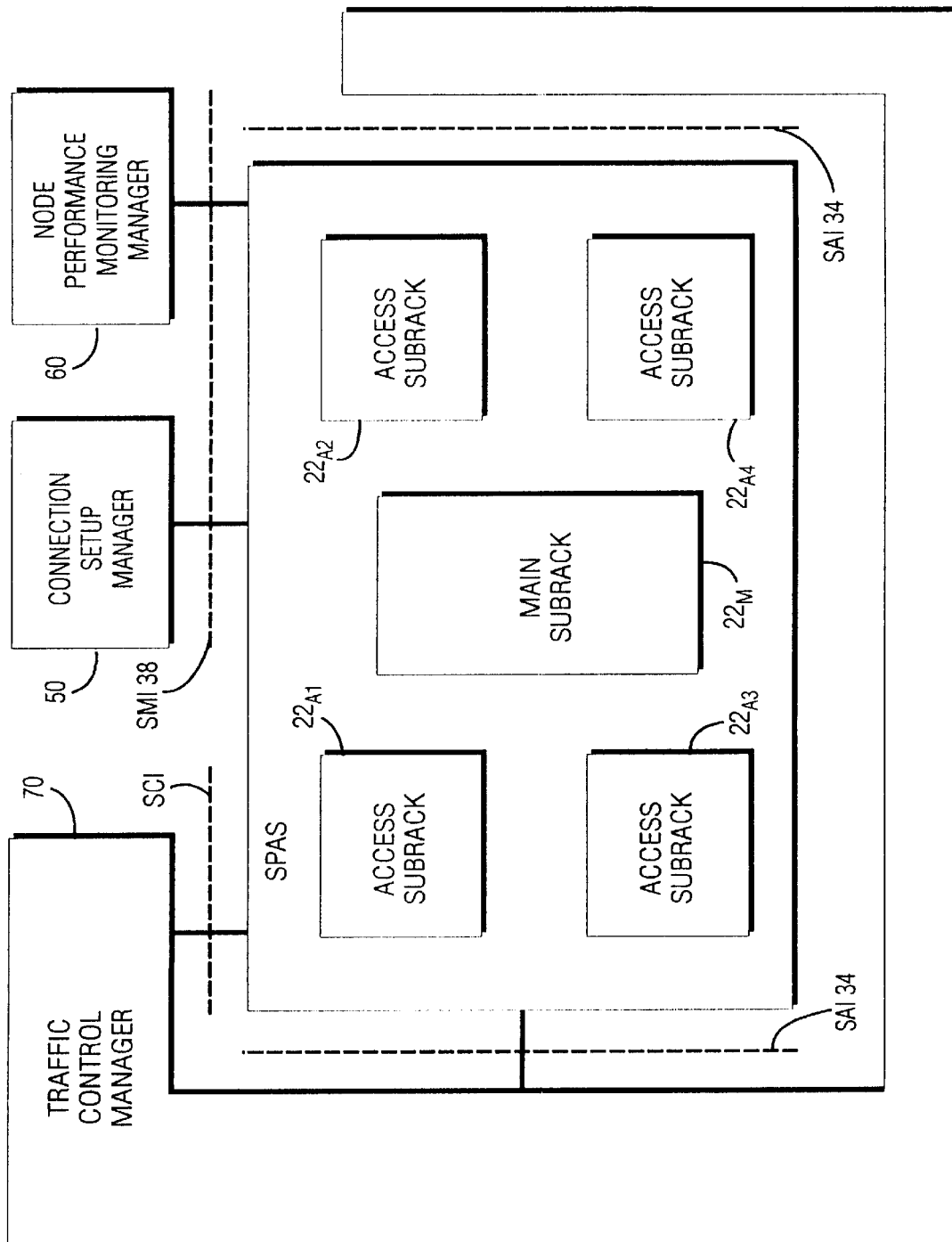
FIG. 2 is a schematic view of an portions of the multi-stage ATM node of FIG. 1 and further including a connection setup manager, a node performance monitoring manager, and a traffic manager.

FIG. 1 primarily shows the subracks 22 of multi-stage ATM node 20. In addition to its subracks 22, the multi-stage ATM node 20 also comprises various managers as shown in FIG. 2. A connection setup manager 50 performs numerous functions, including the forwarding (upon connection set up) of routing tag information to tagging unit BP/TU (see FIG. 3). As hereinafter described, tagging unit BP/TU appends a tag to cells which are to be routed through the ATM node 20, including traffic cells entering the ATM node. As explained subsequently, this tag comprises, e.g., a list of destination addresses for switching of a cell through the ATM node. A node performance monitoring manager 60 controls the monitoring of cell travel through the various switches (e.g., subracks) comprising multi-stage ATM node 20. In addition, a traffic control manager 70 performs various functions, including the function of inserting a quality of service indicator into the tag of the cell.

The connection setup manager 50 and node performance monitoring manager 60 are connected to SPAS by a SPAS Management (SMI) Interface 38 shown in FIG. 2. The SPAS Management (SMI) Interface 38 basically handles the fault, performance, and configuration management of the SPAS. The connection setup manager 50 and node performance monitoring manager 60 can be located at any convenient location in multi-stage ATM node 20, but are preferably located on a main processor MP on a specific device board 30 connected to switch core $24^M$ (see FIG. 1). The main processor (MP) has the basic function of controlling multi-stage ATM node 20.

Although shown as a single block in FIG. 2, the function of traffic control manager 70 can be performed by various processors located within the SPAS. For example, these functions can be handled by one or more board processors (BPs), e.g., in distributed fashion or by a main processor MP of the multi-stage ATM node 20. Thus, one purpose of the BP can be to handle local traffic control in addition to the local fault and performance monitoring functions.

Before a SPAS cell can enter multi-stage ATM node 20, the traffic control manager 70 must request, over SAI (SPAS Access Interface) interface 34, that a connection be set up between two SAIs with specified quality of service (QoS) and traffic parameters. The connection set up request is received by the SPAS and forwarded to the connection setup manager 50. The connection setup manager 50 responds by providing transfer lists for the connection to two tagging units BP/TUs. The two tagging units BP/TUs which receive transfer lists are those on device boards 30 connected to the two external links 28 involved in the connection. The transfer list is a list of destination addresses to be used for switching and routing of the cell through the SPAS. The transfer list received by one of the two tagging units BP/TUs is used for routing cells in one direction through multi-stage ATM node 20; the transfer list received by the other of the two tagging units BP/TUs is used for routing cells in a reverse direction through multi-stage ATM node 20. The transfer lists are written into conversion tables of the two tagging units BP/TUs.

After connection setup, when an ATM cell participating in the connection is received from an external link 28, tagging unit BP/TU obtains the VPI/VCI and link identifier from the header of the incoming ATM cell. Using these parameters, the tagging unit BP/TU consults its conversion table to obtain the transfer list for the cell. In addition, the traffic control manager 70 adds two parameters, specifically cell size and QoS indicator. The transfer list together with the cell size and QoS indicator are known herein as the "SPAS tag" or "routing tag", or simply "tag". The tagging unit BP/TU adds the SPAS tag to the entire ATM cell to form a SPAS cell, the ATM cell being the SPAS payload (see FIG. 4). The SPAS cell with its SPAS tag 82 is delivered across the SAI (SPAS Access Interface) interface 34 to the SPAS. The SAI (SPAS Access Interface) interface 34 is the user plane interface toward the SPAS.

Thus, before entering at the SAI (SPAS Access Interface) interface 34, the SPAS tag comprising the complete transfer list (together with cell size and QoS indicator) is added to the payload of SPAS cell by tagging unit BP/TU. The SPAS tag is used to propagate the cell through the SPAS. The SPAS tag defines the connection endpoint. The SPAS connection can, in its turn, have a number of connections, e.g., ATM connections, multiplexed on it.

Figure 4:
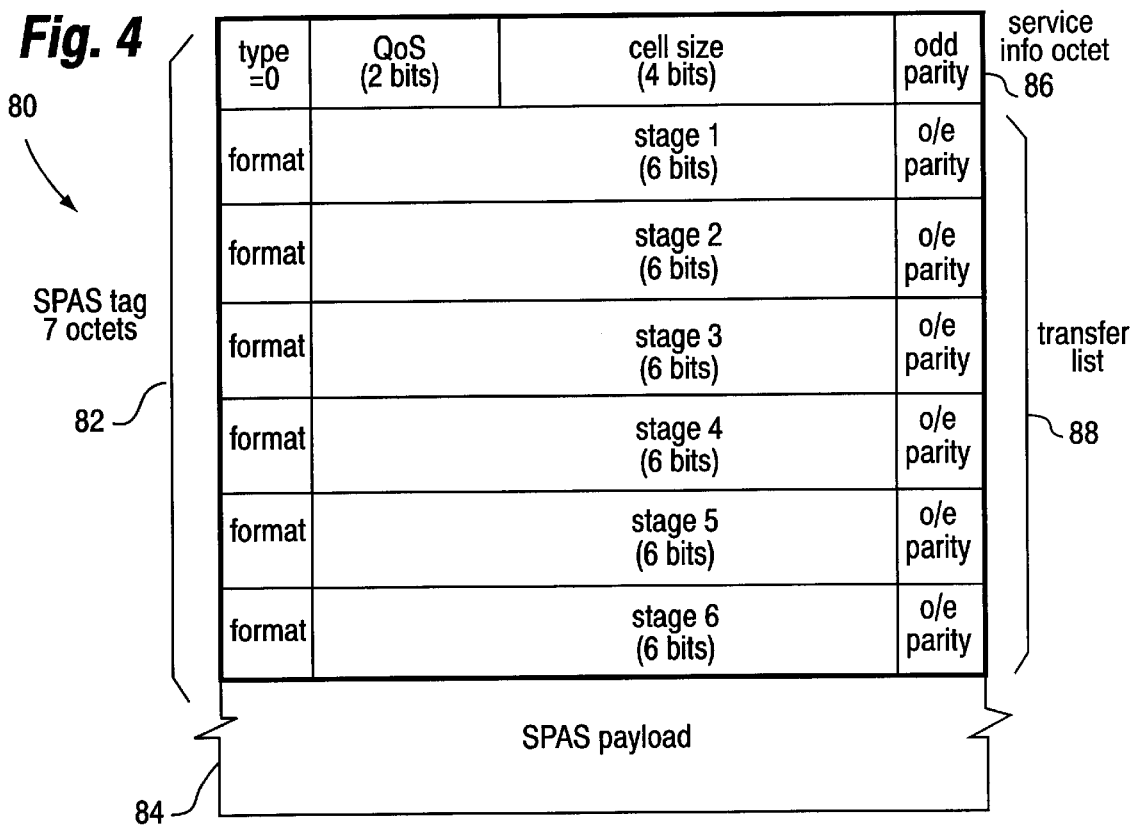
FIG. 4 is a diagrammatic view of an example cell having a SPAS tag applied thereto for transit through the multi-stage ATM node of FIG. 1.

An example format of an SPAS cell 80 with a SPAS tag 82 as applied by tagging unit BP/TU is shown in FIG. 4. The SPAS tag 82 precedes the payload 84 of SPAS cell 80. In the illustrated embodiment, the SPAS tag 82 has seven octets. The first octet, known as the service information octet 86, is generated by traffic control manager 70 as mentioned above. The last six octets of SPAS tag 82 are the transfer list 88.

The service information octet 86 has the four following fields: an odd parity field; a cell size field; a quality of service (QoS) field; and a type field. The type field (one bit) has a zero value if the cell is a traffic cell; a one value in the type field indicates that the cell is a control cell or other cell. The QoS field (two bits) has a value of zero if the cell is of the lowest delay priority and a value of three if the cell is of the highest delay priority. The cell size field (four bits) has stored therein a code having a value of from zero to nine. The code is indicative of both total cell size and the size of the cell payload. The meaning of the cell size code is understood with reference to Table 1 as discussed subsequently. Not shown in Table 1 are cell size codes 12, 13, 14, and 15, which are for concatenated cells and which otherwise have the same meanings as codes 0, 1, 2, and 3, respectively.

TABLE 1

CELL SIZE CODING FOR THE SERVICE INFORMATION OCTET

| Cell Size Code | 0 | 1 | 2 | 3 | 4 | 5 | 6 | 7 | 8 | 9 |
|---|---|---|---|---|---|---|---|---|---|---|
| Total Cell Size | 12 | 18 | 24 | 30 | 36 | 48 | 60 | 60 | 60 | 60 |
| SPAS Payload Size | 5 | 11 | 17 | 23 | 29 | 41 | 53 | 53 | ATM-Cell | ATM-Cell |
| AAL2' Payload | 2 | 8 | 14 | 20 | 26 | 38 | 45 | 45 | x | x |

As indicated above, the transfer list 88 is a list of destination addresses to be used for routing, e.g., switching, of the SPAS cell through multi-stage ATM node 20. In the illustrated embodiment, he transfer list 88 accommodates six octets. As hereinafter explained, the octets of the transfer list 88 are shifted through the transfer list by pop up operations. All of the six octets of transfer list 88 are of identical format, each having a format field; an address field; and a parity bit. The format field (one bit) has a value of zero when the value in the six bit value in the address field is a physical stage address (i.e., the six bit address of the address field corresponds directly to a physical output). The format field (one bit) has a value of one if the value in the address field is to be used for other than a physical address.

When the format field (one bit) of an octet in transfer list 88 has a value of zero, the value in the address field indicates a physical address within multi-stage ATM node 20. In the illustrated examples, these addresses are addresses of switch port interface modules (SPIM) 26, and thus are typically utopia addresses.

When the format field (one bit) of an octet in transfer list 88 has a value of one, the value or logic address (e.g., operation code) in the address field has significance for indicating a certain action. The meanings of these logic addresses depends upon whether the octet is for an even numbered substage or an odd numbered substage. The meanings of these logic addresses for an even numbered stage (e.g., stages 2, 4, and 6) are shown in Table 2. The meanings of these logic addresses for an odd numbered substage (e.g., substages 1, 3, and 5) are shown in Table 3. It is to be noted that the logic address values in the address field for the format one type octet is only valid at the points where they are processed.

TABLE 2

LOGIC ADDRESS MEANINGS FOR EVEN SUBSTAGES IN TRANSFER LIST

| Logic Address Value in Stage Field | Significance |
|---|---|
| 0 | best effort broadcast |
| 1 | guaranteed broadcast |
| 2 | multicast table 1, full multicast table |
| 3 | multicast table 2, limited multicast table |
| 4 | multicast table 3, limited multicast table |
| 5–30 | Reserved for limited multicast connections |
| 31 | Indicates "null"; the cell shall be terminated if it has reached this far. The code shall be inserted in positions not participating in the routing, e.g., if only one subrack is traversed. |
| 32–50 | Reserved for multicast tables |
| 51–59 | Functional address types if the MP/BP has identified itself to the SPIM. If no match, some of the codes could also indicate that the traffic cell shall be broadcasted further. |
| 60–63 | Reserved for SPIM HW, indicates that the cell is for SPIM internal use at the termination point. E.g., for fault and performance management (including flow control). |

TABLE 3

LOGIC ADDRESS MEANINGS FOR ODD SUBSTAGES IN TRANSFER LIST

| Logic Address Value In Stage Field | Significance |
| --- | --- |
| 0 | best effort broadcast |
| 1 | guaranteed broadcast |
| 2 | multicast table 1, full multicast table |
| 3 | multicast table 2, limited multicast table |
| 4 | multicast table 3, limited multicast table |
| 5–30 | Reserved for limited multicast tables |
| 31 | Indicates "null"; the cell shall be terminated if it has reached this far. The code shall be inserted in positions not participating in the routing, e.g., if only one subrack is traversed. |
| 32–63 | Indicates ring topology with the destination ring subrack addressed.. |

The SPAS tag 82 with its transfer list 88 thus, in the present example, supports a SPAS hierarchic structure of six substages. At each substage up to sixty four outputs can be identified. As indicated above, the transfer list 88 is targeted for (but not limited to) a structure with access subrack switches connected to a main switch. One subrack (e.g., subrack 22) is assumed to consume two of the substages of the transfer list 88. Of an odd and even (e.g, first and second) pair of substages in the transfer list 88, the first substage addresses the output board in the subrack and the second substage addresses the device connected to one or two "multiphy utopia" links.

As explained above with reference to the SPAS cell 80 having the format of FIG. 4, each substage or octet in the transfer list 88 has an address field which contains either a destination, source, or null address. After a destination address in the address field of the octet has been utilized for routing purposes, it is replaced with the address of the address from which the cell came (i.e., the source address). If a connection does not use a full transfer list 88 in order to reach its destination, e.g., only two subracks are traversed, the last two substages are "null". If a switch port interface module (SPIM) 26 detects a source address or null at the top of the transfer list 88, the cell is discarded.

Upon entry into the SPAS, all address fields in transfer list 88 that are to be used for routing through the SPAS are to be populated with valid destination addresses. If the routing chain is shorter than the full possible structure, the address fields of the remaining octets in transfer list 88 are set to null. If a null is at the top of transfer list 88, such is detected and the cell is discarded. As indicated above with reference to the format field of each octet in transfer list 88 (see FIG. 4), the value in the address field can be a physical address or a logical address. The physical address in the address field of an octet of transfer list 88 pinpoints an output and is used for normal point-to-point connections at the substage corresponding to the octet. When the format field of the octet in the transfer list 88 indicates that the value in the address field is a logic address, such logic address is used for various other operations (see Table 2 and Table 3).

At each routing substage the destination address in the address field at the top of the transfer list 88 is used. After the destination address for a particular octet is utilized, the transfer list 88 is pushed up or popped up one step and a source address related to the popped octet is inserted in the address field of the last octet in transfer list 88. That inserted source address is marked so that infinite loops can be detected. If a source address is detected at the top of the transfer list 88, the complete SPAS cell is discarded. The source address signifies the physical source. The format field bit of the popped octet is copied to the last octet in the transfer list 88 (the format field in the last octet thus indicating if the previous value of the address field of the popped octet was a physical or logical address). Odd parity applies for a valid destination address, whereas even parity applies for physical source addresses. If an even parity is detected at a demultiplexing point, it shall be regarded as "null" and the entire SPAS cell is judged invalid.

Figure 5:
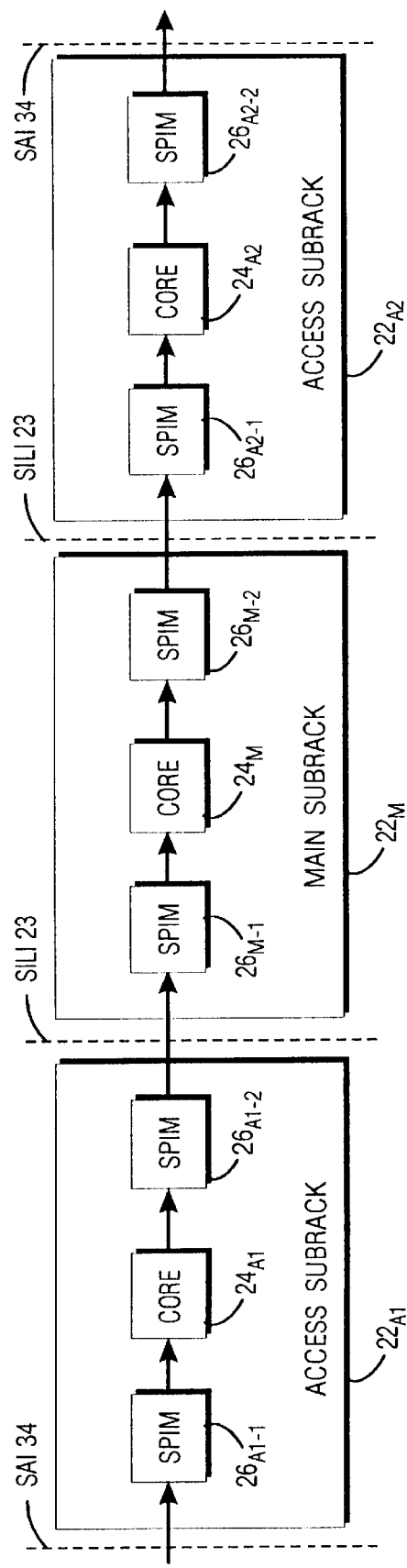
FIG. 5 is a schematic view showing a simplification of the multi-stage ATM node of FIG. 1.

FIG. 5 is a simplification of the multi-stage ATM node 20 of FIG. 1, showing only main subrack $22_M$ and the two access subracks $22_{A1}$ and $22_{A2}$. The simplified view of FIG. 5 shows a depiction of a particular route of travel of a block or stream of SPAS cells through multi-stage ATM node 20. The route of travel begins at the ingress SAI (SPAS Access Interface) interface 34 at which the SPAS cell is directed to switch port interface module (SPIM) $26_{A1\text{-}1}$ of access subrack $22_{A1}$. From switch port interface module (SPIM) $26_{A1\text{-}1}$ the cell goes through core $24_{A1}$ to switch port interface module (SPIM) $26_{A1\text{-}2}$. The switch port interface module (SPIM) $26_{A1\text{-}2}$ applies the cell to a link for transmission to switch port interface module (SPIM) $26_{M\text{-}1}$ of main subrack $22_M$. From switch port interface module (SPIM) $26_{M\text{-}1}$ the cell is routed through core $24_M$ to switch port interface module (SPIM) $26_{M\text{-}2}$. At switch port interface module (SPIM) $26_{M\text{-}2}$ the cell is applied to a link for transmission to switch port interface module (SPIM) $26_{A2\text{-}1}$ of subrack $22_{A2}$. From switch port interface module (SPIM) $26_{A2\text{-}1}$ the cell is routed through core $24_{A2}$ to switch port interface module (SPIM) $26_{A2\text{-}2}$. From switch port interface module (SPIM) $26_{A2\text{-}2}$ the cell is applied to the egress SAI (SPAS Access Interface) interface 34, thereby exiting multi-stage ATM node 20. The address fields of the first five of the six octets of the transfer list 88 for the cell routed through multi-stage ATM node 20 in the manner just described would thus have the physical addresses of the following respective SPIMs: $26_{A1\text{-}2}$; $26_{M1}$; $26_{M\text{-}2}$; $26_{A2\text{-}1}$; $26_{A2\text{-}2}$. The sixth octet carries a valid destination address out on the egress SAI (SPAS Access Interface) interface 34, i.e., out of multi-stage ATM node 20.

FIG. 5A shows demultiplexing points D at which demultiplexing occurs, i.e., at the outlet of each core 24 and at inlets of certain ones of the switch port interface modules (SPIMS) 26 in each subrack 22. The SPAS tag 82 is popped up or pushed up one step at the points labeled "P", e.g., after the demultiplexing points D. In similar manner, FIG. 5B shows the location of multiplexing points ("M") located at the inlet to each core 24 and at the inlet of certain switch port interface modules (SPIMs) 26. The source address is the physical address from the previous multiplexing point closest to the push point. In this way a complete source address list is built up (except for the SAI addresses). The source address transfer list can be use for various purposes, e.g., performance monitoring on any SPAS connection, either end-to-end or any particular segment. The multiplexing points are not controlled by the SPAS tag 82. An SPAS cell is consequently always routed to the next demultiplexing point on which the SPAS tag 82 operates. A SPAS cell across the SAI (SPAS Access Interface) interface 34 must pass at least two multiplexing points M, two demultiplexing points D, and one push point (see FIG. 5A and FIG. 5B). Thus, in the illustrated embodiment, up to five translation points T (e.g., points at which a destination address gets popped up) are possible (see FIG. 5C). As the destination addresses are popped up, the last octet of the transfer list 88 is filled with the source address as described above. The list of source addresses thus being built up in the transfer list 88 can be used to monitor the quality of the SPAS connections that participate in the performance monitoring.

The purpose of the performance monitoring of the invention, as facilitated by node performance monitoring manager 60, is to check the quality of the connection for a block of data, e.g., specified streams of cells routed through at least part of multi-stage ATM node 20. Quality can mean, for example, cell loss and bit error rate. In order to implement the performance monitoring of the present invention, the node performance monitoring manager 60 works in conjunction with various monitoring points established. in the SPAS. As explained below, the performance monitoring can be conducted with respect to a cell's entire route of travel through the SPAS, or to one or more segments of the cell's route of travel through the SPAS. The monitoring is made on the payload 84 of the SPAS cell 80 aggregated for all cell sizes in the defined data block and segment.

Figure 5D:
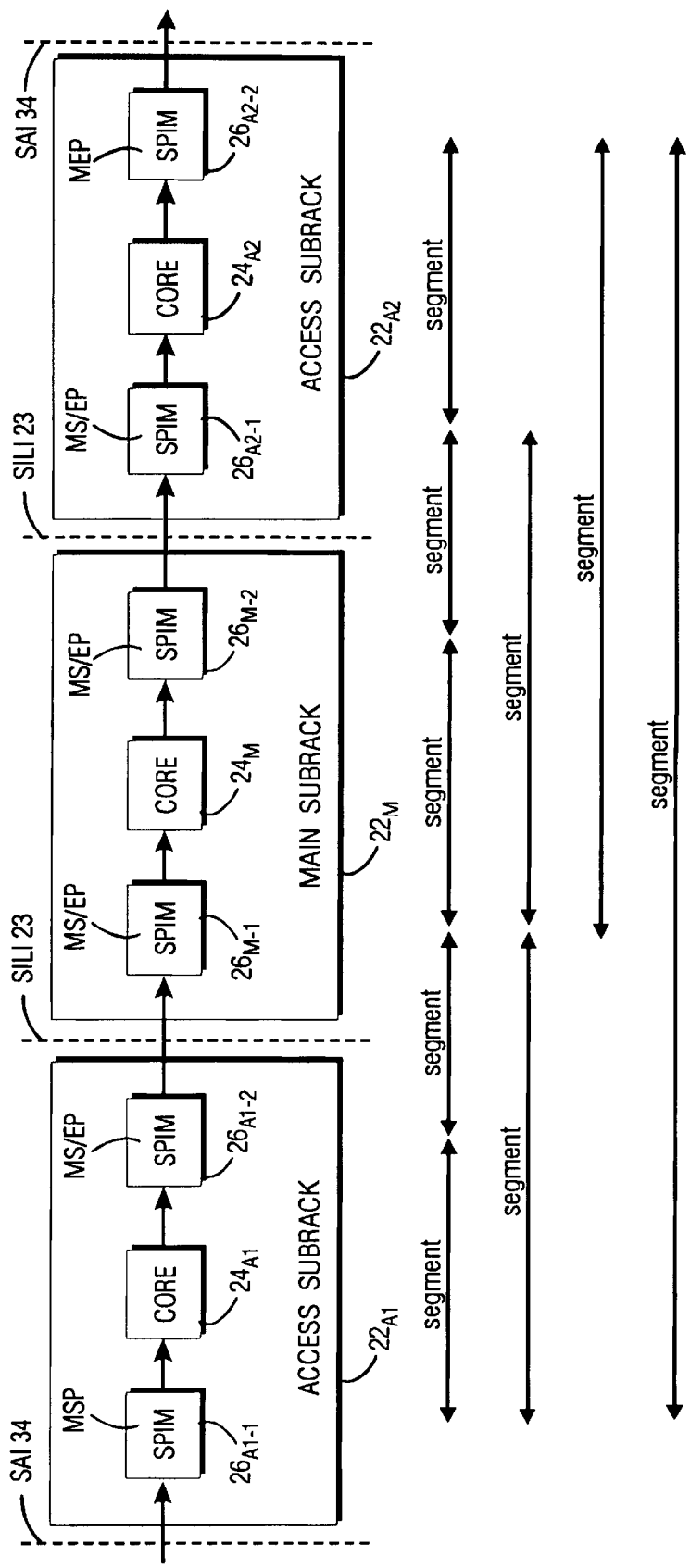
FIG. 5D is a schematic view showing monitoring points in the multi-stage ATM node as depicted in FIG. 5.

FIG. 5D shows various potential monitoring points in the SPAS utilized by node performance monitoring manager 60. The potential monitoring points include a monitoring start point MSP; monitoring start/end points MS/EP; and a monitoring end point MEP. Performance monitoring can start at any of the monitoring start point MSP and monitoring start/end points MS/EP inside the SPAS, and can end at any of the monitoring start/end points MS/EP and monitoring end point MEP inside the SPAS. With this in mind, FIG. 5D further illustrates four scenarios of how segments can be defined and monitored in the SPAS by node performance monitoring manager 60. A first such scenario shows all possible (five) SPIM-SPIM paths in the SPAS being defined as a separate segment. A second scenario shows two segments being defined and monitored, each segment being from a first SPIM of a subrack to the first SPIM of a subsequent subrack. The third scenario shows a segment being defined from SPIM $26_{M\text{-}1}$ to $SPIM_{A2\text{-}2}$. The fourth scenario shows a segment being defined as the entire path of the cell through the SPAS, i.e., from SPAS $26_{A1\text{-}1}$ to SPAS $26_{A2\text{-}2}$.

The shorter a segment, the more SPAS connections can traverse that segment. This is because there is a multiplexing point prior to the monitoring start point and a demultiplexing after the monitoring end point. A maximum segment spanning SAI (ingress) to SAI (egress) can only hold the connections traversing over the SAIs in question.

When a segment is monitored by node performance monitoring manager 60, all SPAS connections and higher layer connections (e.g., ATM connections) that are multiplexed on that segment are monitored so long as they have the specified quality of service (QoS), a valid physical destination address at the start point, and a valid source address at the end point for the substages of the transfer list 88 which comprise the segment. To be valid, a physical address must comprise at least one substage.

In the monitoring operation performed under control of node performance monitoring manager 60, a block of data is bounded by a not participating start cell and a stop cell, which are described in more detail subsequently in connection with SPAS control cells. The quality on all valid cells (traffic cells and otherwise) between the start cell and the stop cell is monitored.

The establishment of a monitoring operation supervised by node performance monitoring manager 60 has three phases—an activation phase; a monitoring phase; and a reporting phase. Prior to discussing each phase, mention is first made regarding activation and deactivation points for the performance monitoring. FIG. 5E specifically shows potential activation and deactivation points in connection with the example embodiment previously discussed. FIG. 5E shows location of the following potential points: an activation point (AP); activation/reporting points (A/RP); and a reporting point (RP). From FIG. 5E it can be seen that SPIM $26_{A1\text{-}1}$ can serve only as an activation point (AP); that SPIM $26_{A2\text{-}2}$ can serve only as a reporting point (RP); and that the SPIMs $26_{A1\text{-}2}$ and $26_{M\text{-}2}$ can serve either as an activation point or a reporting point, e.g,. can serve as activation/reporting points (A/RP). An activation point is a point that can, under supervision of node performance monitoring manager 60, initiate performance monitoring and define the segment size. An activation point can only define segments starting in the same SPIM. Similarly, a reporting point can only operate on a monitoring end point in the same SPIM.

Figure 6:
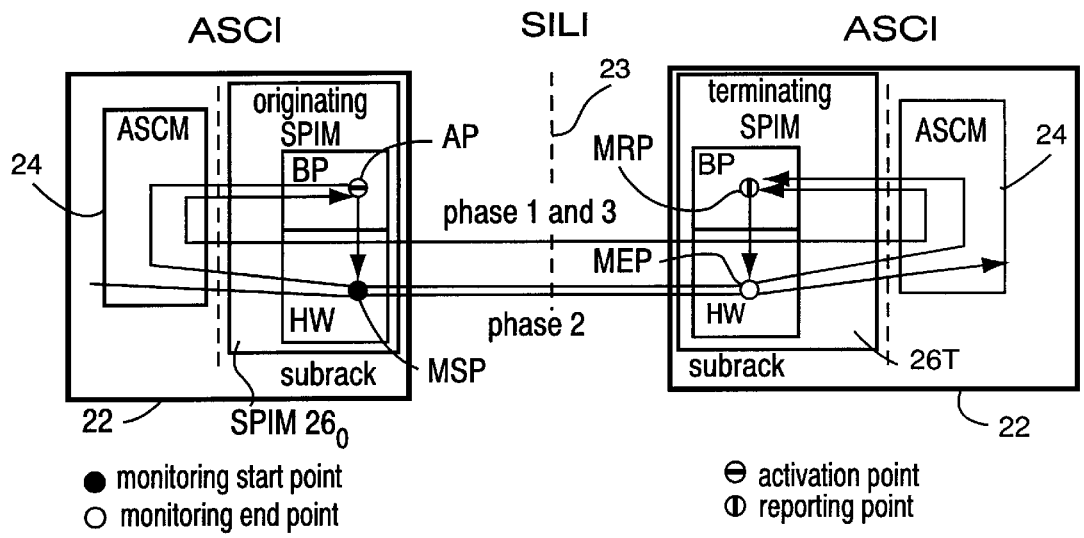
FIG. 6 is a schematic view showing an origination end and a terminating end of a segment of the multi-stage ATM node of FIG. 1.

The function of activation and reporting points is understood with reference to FIG. 6. FIG. 6 particularly shows two SPIMs 26 which are situated at endpoints of a monitored segment. In FIG. 6, SPIM $26_O$ is referred to as the originating SPIM, while SPIM $26_T$ is referenced as the terminating SPIM. The segment monitored could be any possible segment in the SPAS, e.g., any of the segments shown in FIG. 5D, for example. Each of the SPIMs $26_O$ and $26_T$ is shown as having a board processor (BP) and hardware (HW). The SPIM $26_O$ is shown as having an activation point AP in its board processor (BP) and a monitoring start point (MSP) in its hardware. Similarly, SPIM $26_T$ has a reporting point RP in its board processor (BP) and a monitoring end point (MEP) in its hardware. The SPIMs $26_O$ and $26_T$ are shown as residing on their respective subracks 22, each subrack 22 having a switch core (ASCM) 24.

Since the transfer list 88 is built up as a pair of destination addresses, the monitoring control signals must traverse the ASCM (switch core) in both subracks in order to span the SILI (SPAS Internal Link Interface) interface 23 [see FIG. 6]. The board processors (BPs) in SPIM $26_O$ and SPIM $26_T$ conduct the monitoring, under supervision of node performance monitoring manager 60. As shown in FIG. 6, all control signals in phase 1 (the activation phase) and in phase 3 (the reporting phase) are carried directly between the board processors (BPs) of SPIM $26_O$ and SPIM $26_T$. In phase 2 (the monitoring phase), the start and stop signals (described in more detail subsequently as "start" and "stop" SPAS control cells) are recognized by the monitoring start point MSP and the monitoring end point MEP as well. The monitored connection is only recognized by the monitoring points, and only for the duration of the monitoring.

Figure 8:
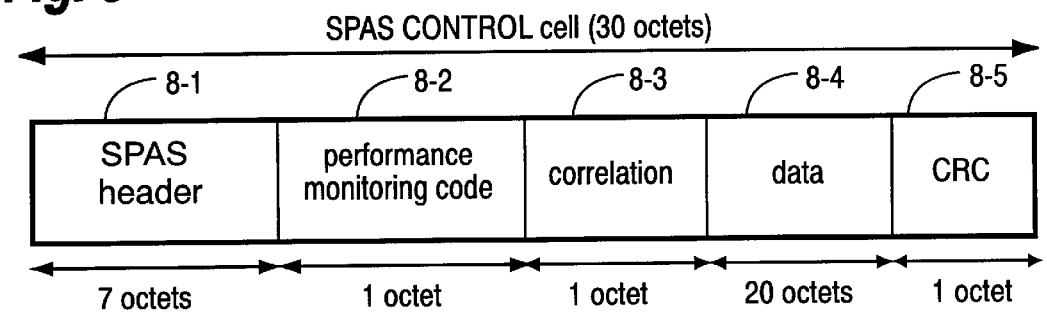
FIG. 8 is a diagrammatic view showing an example format of a SPAS performance monitoring control cell according to an embodiment of the invention.

The board processors of originating SPIM $26_O$ and terminating SPIM $26_T$ communicate with one another using special cells known as SPAS performance monitoring control cells, also known as "monitoring management cells", "SPAS control cells", or simply "control cells". An example format of a SPAS performance monitoring control cell is shown in FIG. 8. In the illustrated embodiment, each SPAS performance monitoring control cell is thirty octets in length. In such embodiment, the SPAS performance monitoring control cell has five fields: a header field 8-1; a performance monitoring code field 8-2; a correlation field 8-3; a data field 8-4; and, a CRC field 8-5. All but the header field 8-1 and the data field 8-4 are but one octet in length, the header field 8-1 being seven octets and the data field 8-4 being twenty octets. The header field 8-1 of the SPAS performance monitoring control cell is the very tag applied by the tagging unit (BP/TU) which also tags traffic cells.

As indicated by the value in its performance monitoring code field 8-2, a SPAS performance monitoring control cell can be one of three types. If the performance monitoring code has a value of zero, the SPAS performance monitoring control cell indicates that performance monitoring has been activated. An activation SPAS performance monitoring control cell carries, in its data field 8-4, comparison data that shall be used by the monitoring end point and indicates which part(s) of the transfer list is being monitored and the quality of service (QoS) parameter for monitoring. By "comparison data" is meant contents of an entire transfer field that is to be used by terminating SPIM $26_T$ for setting up its monitoring activity.

If the performance monitoring code has a value of one, the SPAS performance monitoring control cell is a "respond" cell sent from terminating SPIM $26_T$ and indicating whether terminating SPIM $26_T$ accepts the monitoring function or not. If the performance monitoring code has a value of one, the SPAS performance monitoring control cell is a "result" cell sent from terminating SPIM $26_T$ to originating SPIM $26_O$ and having monitored data collected at the monitoring end point (MEP) in its data field 8-4.

Figure 7:
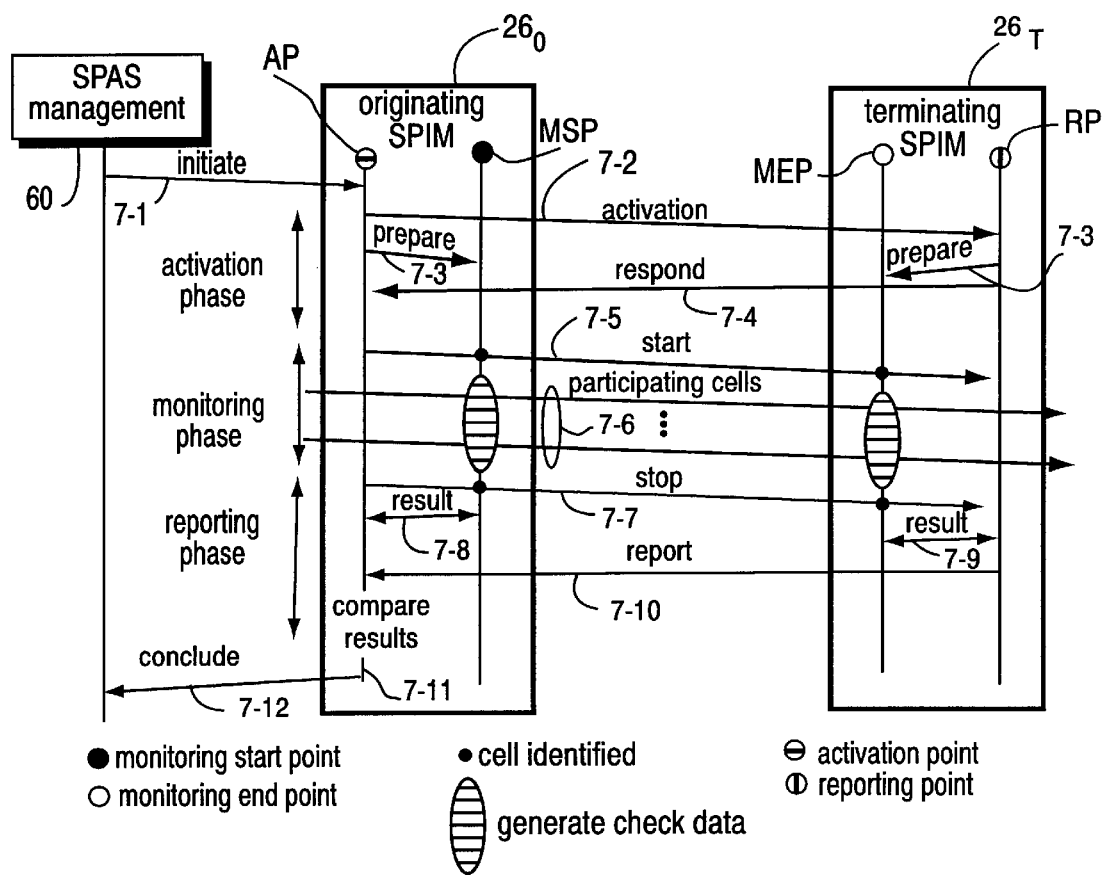
FIG. 7 is a schematic view showing signaling and cell flow in a performance monitoring example according to a mode of the invention in the multi-stage ATM node of FIG. 1.

FIG. 7 provides an performance monitoring example which illustrates all three phases—the activation phase; the monitoring phase; and the reporting phase. As event 7-1, node performance monitoring manager 60 sends an initiate performance monitoring signal to the board processor of originating SPIM $26_O$. Event 7-1 starts the activation phase.

As part of the activation phase, the board processor (BP) of originating SPIM $26_O$ sends an activation SPAS performance monitoring control cell as event 7-2 to the board processor (BP) of the terminating SPIM $26_T$. The activation SPAS performance monitoring control cell has a performance monitoring code of zero in its field 8-2 (see FIG. 8), and carries in its data field 8-4 an entire transfer list to be used as comparison data for the monitoring, as well as the quality of service (QoS) parameter involved in the monitoring. At the same time, originating SPIM $26_O$ prepares the hardware resources at the monitoring start point (MSP) for the monitoring phase (as indicated by event 7-3). The preparation of event 7-3 means that the monitoring start point (MSP) begins (1) to look for start control cells and stop control cells which respectively start and stop monitoring on the segment to be monitored, and (2) [between the start and stop control cells] to look for cells which have, in their transfer list 88, both the specific transfer list pattern specified as the comparison data upon activation and the specified QoS parameter.

Upon receipt of the activation SPAS performance monitoring control cell sent as event 7-2, the board processor (BP) of terminating SPIM $26_T$ analyzes the content of the activation SPAS performance monitoring control cell (particularly data field 8-4 which includes the entire transfer list and quality of service indicator [see FIG. 8]) and determines whether terminating SPIM $26_T$ can participate in the performance monitoring requested by originating SPIM $26_O$. Reasons for not being able to participate in the performance monitoring may be lack of resources at the targeted terminating SPIM $26_T$, or that the existing resources at the switch port interface module (SPIM) 26 are occupied either by other active performance monitoring or other activities. If terminating SPIM $26_T$ determines that it can participate in the performance monitoring, switch port interface module (SPIM) 26 prepares it resources for such participation, as indicated by event 7-3. The preparation of event 7-3 involves the board processor (BP) of terminating SPIM $26_T$ advising the hardware (HW) of terminating SPIM $26_T$ that the monitoring end point (MEP) thereof should look for SPAS tags 82 with a certain source address and QoS in the selected part of the transfer list 88 for participating cells, as well as to be on the lookout for the specific code in the transfer list 88 indicating to start and stop the monitoring. The terminating SPIM $26_T$ also sends a response SPAS performance monitoring control cell to originating SPIM $26_O$ as event 7-4, indicating whether or not the terminating SPIM $26_T$ can participate in the performance monitoring. As indicated previously, the response SPAS performance monitoring control cell has a value of one in its performance monitoring code field 8-2 (see FIG. 8).

Upon receipt of the response SPAS performance monitoring cell from terminating SPIM $26_T$ the monitoring phase begins (see FIG. 7). In the monitoring phase generally, the monitoring start point (MSP) generates check data for a block of SPAS cells which have a common physical destination address in the transfer list 88 all the way to the specified monitoring end point (MEP), e.g., the terminating SPIM $26_T$. In the monitoring phase, both the monitoring start point (MSP) at originating SPIM $26_O$ and the monitoring end point (MEP) at terminating SPIM $26_T$ are prepared to look in the SPAS tag 82 of received SPAS cells, and particularly in transfer list 88 thereof, for their specific pattern. The pattern sought by the monitoring start point (MSP) is not the same as the pattern sought by the monitoring end point (MEP), since the monitoring start point (MSP) looks for a particular destination address in the appropriate octet of transfer list 88 while the monitoring end point (MEP) looks for a source address that identifies originating SPIM $26_O$.

Describing now the monitoring phase in more detail, under supervision of node performance monitoring manager 60, the originating SPIM $26_O$ issues a SPAS control cell that includes two instances of a start code, i.e., a "62" value in the address field of two octets in transfer list 88 of SPAS tag 82 (see Table 2). In which two of the octets the start code is included depends upon and corresponds to the location of the monitoring stop point. In other words, in the transfer list, the start code is substituted in two positions (e.g., two substages) corresponding to the SPIMs which are supposed to act on the start code. When the SPAS control cell containing the start code is detected at the monitoring start point (MSP), the monitoring begins at originating SPIM $26_O$. Moreover, having discovered from the start code that the monitoring is to begin, the monitoring start point (MSP) then removes the first instance of the start code from the transfer list and substitutes therefore the address of the monitoring start point. In connection with this substitution, the SPIM looks at a correlated value that is stored during activation by its local board processor (see FIG. 6) associated with this correlation value is the real tag value for the position in the SPIM. In this way, the address of the monitoring start point (MSP) continues with the SPAS cell (which still includes a second instance of the start code).

FIG. 7 shows as event 7-5 the transmission of this same SPAS control cell with the start code from originating SPIM $26_O$ to terminating SPIM $26_T$. When that same SPAS control cell containing the second instance of the start code is detected at the monitoring end point (MEP), the monitoring begins at terminating SPIM $26_T$. The presence of the start code (second instance of) in a position of the transfer list corresponding to the monitoring end point (MEP) causes the terminating SPIM to realize that it is the monitoring end point. In like manner as was done at the monitoring start point (MSP), the terminating SPIM replaces the instance of the start code with the address of the terminating SPIM so that the SPAS cell can now continue with a complete transfer list.

Figure 9:
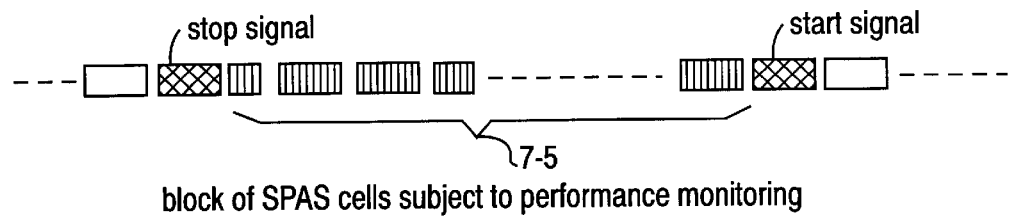
FIG. 9 is a diagrammatic view showing transmission of a block of SPAS cells in connection with a performance monitoring operation.

The flow of further SPAS cells (which can be traffic cells and can include other SPAS control cells) from originating SPIM $26_O$ to terminating SPIM $26_T$ is indicated by event 7-6 (see also FIG. 9). The SPAS cells can be any of the approved sizes (see the description of the cell size field in service information octet 86 of FIG. 4). Monitoring data is generated both at originating SPIM $26_O$ and terminating SPIM $26_T$ for each SPAS cell with the comparison data pattern in its transfer list 88.

While the SPAS cells are transmitted from originating SPIM $26_O$ to terminating SPIM $26_T$ as part of event 7-6 of the monitoring operation (see FIG. 7 and FIG. 9), monitoring data is maintained at both originating SPIM $26_O$ and terminating SPIM $26_T$. The monitoring data can be of several conventional forms, but preferably is cell count and/or integrity check of the content of the payload 84 by means of a total checksum for all such cells.

Under supervision of node performance monitoring manager 60, at an appropriate time the originating SPIM $26_O$ issues a SPAS control cell that includes a stop code, i.e., a "63" value in the address field of two octets of transfer list 88 of SPAS tag 82 (see Table 2). As with the two instances of the start code, the two instances of the stop code occur in substages of the transfer list that correspond to the monitoring start point (MSP) and the monitoring end point (MEP). When a SPAS control cell bearing the stop code is detected at monitoring start point (MSP), originating SPIM $26_O$ stops its gathering of monitoring data, and replaces the first instance of the stop code with the monitoring start point (MSP) address. The SPAS control cell still bearing the second instance of the stop code is transmitted on to terminating SPIM $26_T$, as indicated by event 7-7 in FIG. 7. When the SPAS control cell bearing the second instance of the stop code is received at monitoring end point (MEP), terminating SPIM $26_T$ also ceases its gathering of monitoring data and replaces the second instance of the stop code with the monitoring end point (MEP) address. In essence, the performance monitoring data collected at both originating SPIM $26_O$ and terminating SPIM $26_T$ is frozen. The board processor (BP) of originating SPIM $26_O$ and the board processor (BP) of terminating SPIM $26_T$ both generate monitoring data results, as shown by event 7-8 and event 7-9, respectively. In generating the monitoring data results, the board processors (BPs) of the SPIMs read registers that have the monitoring data stored therein.

Upon completion of its generation of monitoring data results, the board processor (BP) of terminating SPIM $26_T$ issues a results report, also known as the termination unit report, to the board processor (BP) of originating SPIM $26_O$ as event 7-10. The results report is included in the report SPAS performance monitoring control cell as previously described. In particular, the data field 8-4 of the SPAS performance monitoring control cell includes the monitoring data results collected at the monitoring end point (MEP).

Upon receipt of the report SPAS performance monitoring control cell from terminating SPIM $26_T$, the board processor (BP) of originating SPIM $26_O$ performs an analysis to compare the received results from terminating SPIM $26_T$ with its own results, as indicated by event 7-11. The originating SPIM $26_O$ develops a conclusion based on its analysis, and sends a conclusion report to node performance monitoring manager 60, as indicated by event 7-12. As indicated previously, node performance monitoring manager 60 may be located in a main processor of multi-stage ATM node 20.

As an alternative to the foregoing reporting scheme, both terminating SPIM $26_T$ and originating SPIM $26_O$ can separately forward their performance monitoring data results to node performance monitoring manager 60, so that node performance monitoring manager 60 can perform the analysis.

Figure 14:
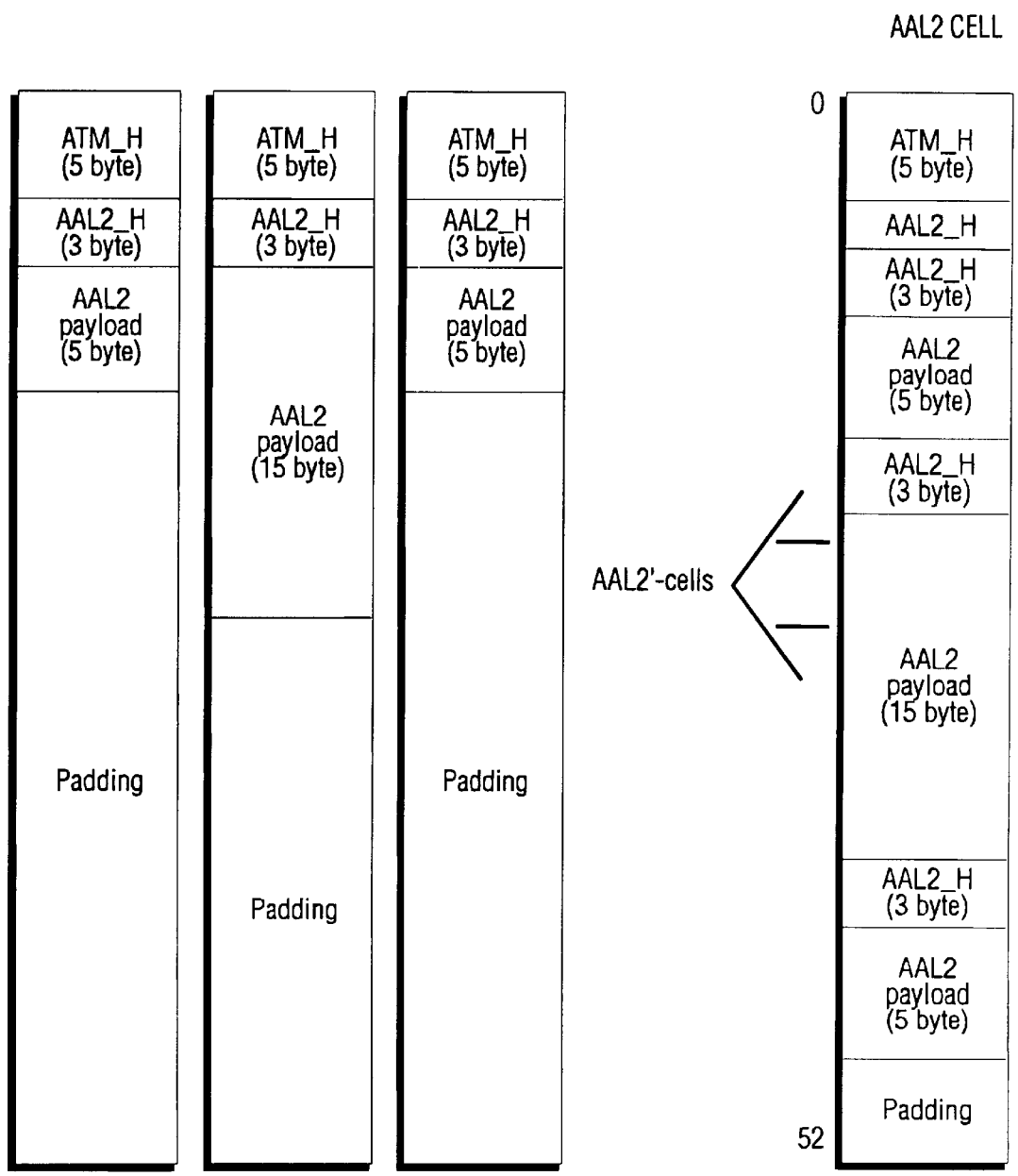
FIG. 14 is a diagrammatic view showing demultiplexing of an ATM cell having AAL2 protocol into an ATM cell having AAL2 prime protocol.

Returning now to Table 1, each cell size code of the service information octet 86 specifies a set of sizes, including a total cell size, a SPAS payload size, and an AAL2' payload size. AAL2' (also written AAL2 prime) is a special protocol which is described in U. S. patent application Ser. No. 09/188,102, filed Nov. 9, 1998, entitled "Asynchronous Mode Transfer System", which is incorporated herein by reference. AAL2 prime (AAL2') requires that AAL2 packets carried in the ATM cell payload be whole packets and that the ATM payload not have an AAL2-type start field. Preferably, in the AAL2 prime protocol only one whole AAL2 packet is carried per ATM cell payload. It will be recalled that AAL2 is a standard defined by ITU recommendation 1.363.2. An AAL2 packet comprises a three octet packet header, as well as a packet payload. The AAL2 packet header includes an eight bit channel identifier (CID), a six bit length indicator (LI), a five bit User-to-User indicator (UUI), and five bits of header error control (HEC). The AAL2 packet payload, which carries user data, can vary from one to forty-five octets. FIG. 14 is a diagrammatic view showing demultiplexing of an ATM cell having AAL2 protocol into an ATM cell having AAL2 prime protocol.

Figure 4A:
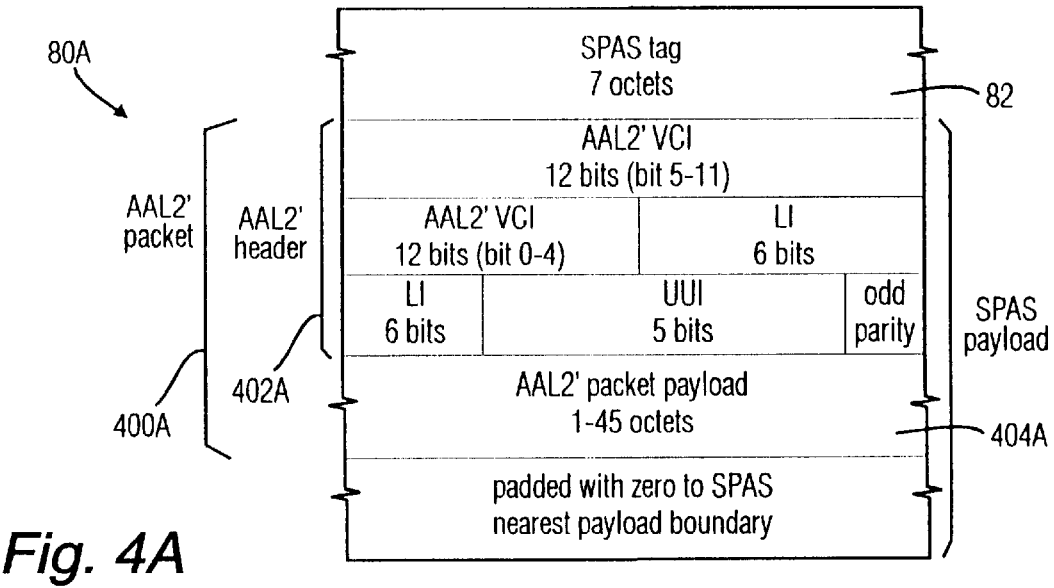
FIG. 4A is a diagrammatic view of an example cell having a SPAS tag applied thereto for transit through the multi-stage ATM node of FIG. 1, the example cell having an AAL2' protocol packet.

As reflected by Table 1, cell size codes 1–6 in a service information octet 86 are used for AAL2' format (or perhaps another ATM format, if desired). FIG. 4A shows the format of a SPAS cell 80A which carries an ALL2' packet. As with all other cells transmitted through multi-stage ATM node 20, SPAS cell 80A of FIG. 4A has a SPAS tag 82. The SPAS tag 82 has the same seven octet format as shown in FIG. 4. The SPAS tag 82 is followed by the AAL2' packet 400A, which includes the AAL2' header 402A and an AAL2' packet payload 404A. The AAL2' packet payload 404A can carry up to 45 octets. If an AAL2 packet multiplexed into the AAL2' protocol require greater than 45 octets, the AAL2 packet must be segmented into two AAL2' packets. The first packet uses a LI code (see FIG. 4A) above 45 (e.g., 48) to indicate a fixed predefined AAL2' packet size, e.g., 32 octets. The LI code of the last AAL2' packet indicates the real size of the last of the two packets. Upon receipt of the two AAL2' packets at a receiving side, they are reassembled into a unit. The AAL2' header is protected by an odd parity bit.

Figure 4B:
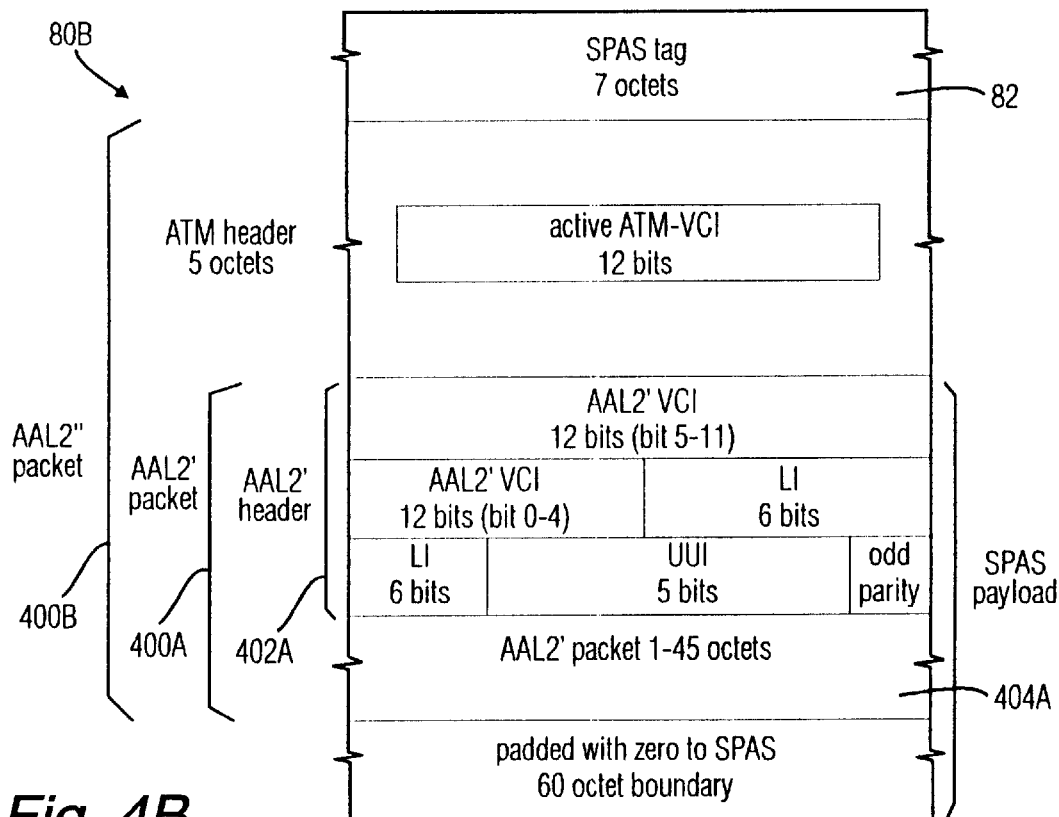
FIG. 4B is a diagrammatic view of an example cell having a SPAS tag applied thereto for transit through the multi-stage ATM node of FIG. 1, the example cell having an AAL2" protocol packet.

Cell size code 7 in a service information octet 86 (see FIG. 4 and Table 1) is used for yet another protocol, AAL2" (also written AAL2 double prime). FIG. 4B illustrates a SPAS cell 82B which invokes the AAL2" protocol, and also illustrates a AAL2" packet 400B having the AAL2" protocol. In the AAL2" protocol, an AAL2' packet (such as AAL2' packet 400A) is carried in an ATM cell, and the ATM-VCI is used to indicate the connection. SPAS cell 80B begins with the SPAS tag 82 (same format as FIG. 4), and is followed by the AAL2" packet 400B. The AAL2" packet 400B includes the ATM header (5 octets, including 12 bits of the active ATM-VCI) and the AAL2' packet 400A. In the AAL2" protocol, the AAL2' VCI is copied to the twelve least significant bits of the ATM VCI. The most significant bits are set to zero, as are the VPI, PTI, and CLP.

The AAL2" protocol allows an easy protocol transformation between AAL2' and AAL2" that can be accomplished in hardware the switch port interface module (SPIM) 26. This transformation can be useful in those cases where the external equipment/component only recognizes sixty octet cells with an ATM header and not AAL2'. Examples of those cases are an AAL5-SAR (Segmentation and Reassembly) component interfacing a main processor (MP) or an Exchange Terminal (ET) [in the later case if for some reason the AAL2" is used on the external ATM links instead of AAL2].

Figure 4C:
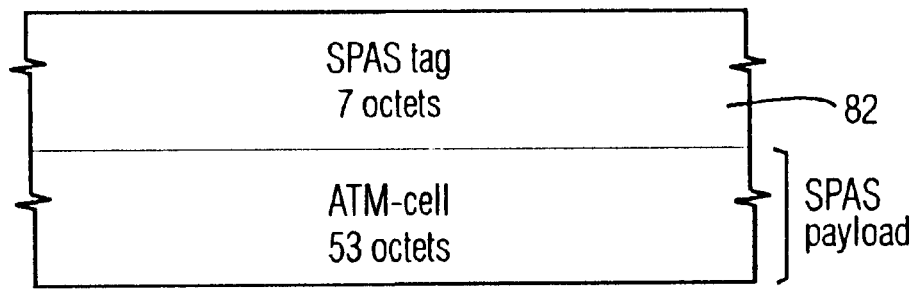
FIG. 4C is a diagrammatic view of an example cell having a SPAS tag applied thereto for transit through the multi-stage ATM node of FIG. 1, the example cell being for a 8 bit Utopia device.
Figure 4D:
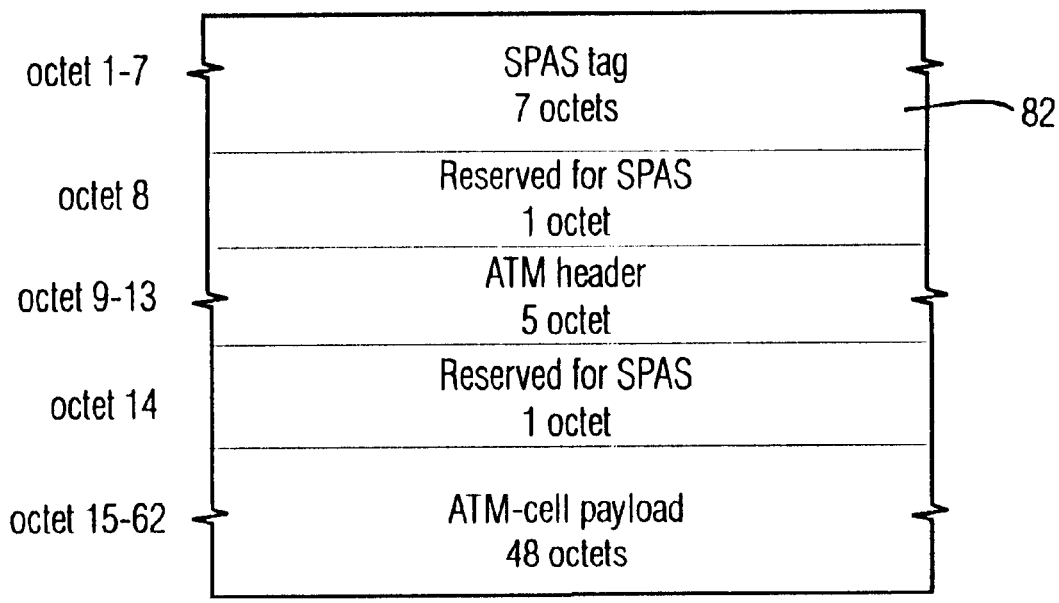
FIG. 4D is a diagrammatic view of an example cell having a SPAS tag applied thereto for transit through the multi-stage ATM node of FIG. 1, the example cell being for a 16 bit Utopia device.

For cell size codes 7–9, an additional adaptation must be made to the actual Utopia implementation, depending on whether the Utopia device is eight bits or sixteen bits wide. FIG. 4C shows an example ATM cell format for a 8 bit Utopia, which includes the SPAS tag 82 and has a total SPAS cell size of 60 octets. The multi-stage ATM node 20 transfers the entire ATM cell transparently between the two endpoints. FIG. 4D, on the other hand, shows an example ATM cell format for a 16 bit Utopia, which includes the SPAS tag 82 and has a total SPAS cell size (over the SAI interface) of 62 octets. For the FIG. 4D cell, octet 8 and octet 14 are removed by the multi-stage ATM node 20 during internal transport. Octets 9–13 and 15–62 are carried transparently (since the multi-stage ATM node 20 will convert between the two Utopia formats when needed).

Cell size code 8 (see FIG. 4 and Table 1) is used to denote a transparent ATM cell. Cell size code 9 used to denote an ATM AAL5 cell that could be subject to Early Packet Discard (EPD). Cell size codes 12–15 are for internal usage of multi-stage ATM node 20, while cell size code 10 is reserved for future use.

Figure 11:
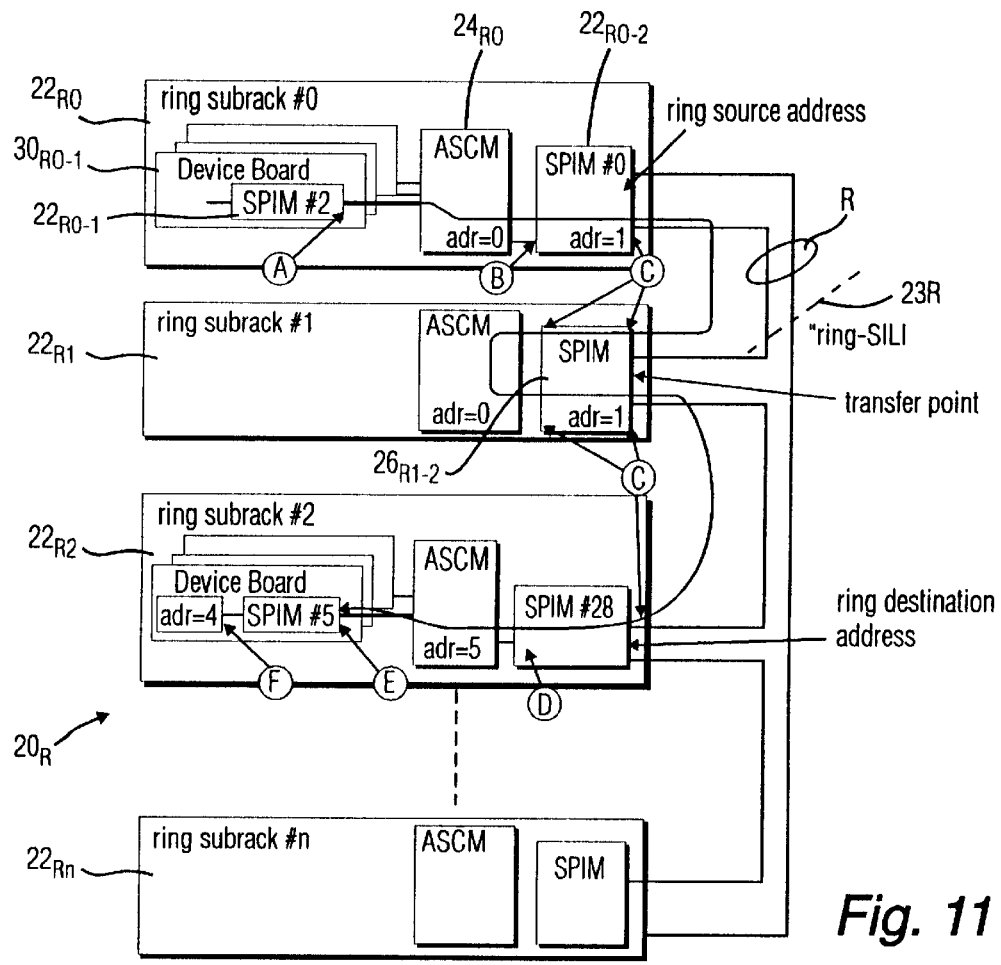
FIG. 11 is a schematic view of an embodiment of the multi-stage ATM node of the present invention having a ring or bus topology.

The multi-stage ATM node 20 can also be structured to have a bus or ring configuration, as illustrated in FIG. 11 for example. The ringed multi-stage ATM node 20R of FIG. 11 comprises n number of subracks, particularly subracks $22_{R0}$ through $22_{Rn}$. The subracks $22_R$ are connected by a bus or ring R. As in previous embodiments, Each subrack $22_R$ has a switch core 24 connected intermediate two sets of switch port interface modules (SPIM) 26. For example, subrack 22 has switch core $24_{R0}$; switch port interface module (SPIM) $26_{R0-1}$ (also labeled "SPIM #2 "); and switch port interface module (SPIM) $26_{R0-2}$ (also labeled "SPIM #0") at address (adr) 0. At at address adr=1 the SPIM $26_{R2}$ is connected to ring R. The switch port interface module (SPIM) $26_{R0-1}$ is shown (in manner similar to FIG. 1) as being situated on a device board $30_{R0-1}$. For sake of simplification, in the ensuing discussion, reference to the various switch port interface modules (SPIMs) 26 will simply be to SPIM #0 and SPIM #2 on subrack $22_{R0-1}$, to SPIM $26_{R1-2}$ on subrack $22_{R1-2}$, and to SPIM #5 and SPIM #28 on subrack $22_{R2}$, as shown in FIG. 11.

Figure 12:
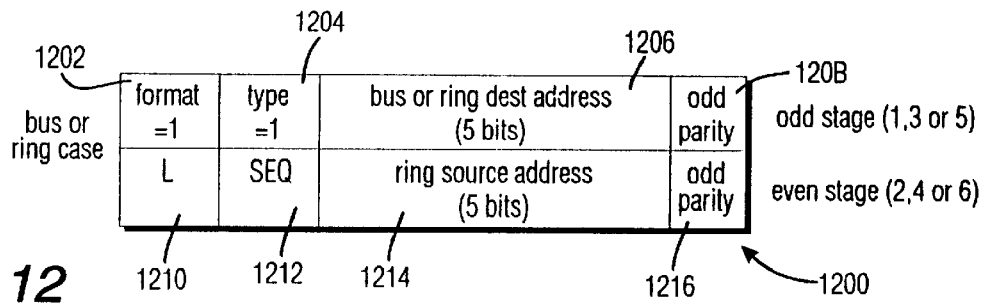
FIG. 12 is a diagrammatic view of a octet pair employed in a SPAS tag applied for the ringed multi-stage ATM node of FIG. 11.

When a bus or ring topology is employed for a multi-staged ATM node, the SPAS tag 82 has two adjacent octets combined to yield an octet pair which represents the bus or ring. Such an octet pair is shown in FIG. 12 as octet pair 1200. The following fields are provided in the first octet of octet pair 1200: format field 1202; type field 1204; (bus or ring) destination address field 1206; and odd parity field 1208. The type field 1204, when set to "one" indicates that a bus or ring topology is invoked. A bus or ring topology can support, in the illustrated embodiment, up to 32 subracks. The destination address field 1206 contains an address of a target ring subrack. The following fields are provided in the second octet of octet pair 1200: "L" field 1210; "SEQ" field 1212; (bus or ring) source address field 1214; and even parity field 1216. For the "L" field 1210, a "1" indicates a logic address (in which case the logic address occupies the destination giving $2^{10}$ logic combinations of destination and source address including broadcast, multicast, and resource shift). The "SEQ" field 1212 can be used as a sequence counter on a link set or used to extend the logic address field, if necessary.

In an example scenario of a ring-employing multi-stage ATM node 20R, typically an ingress subrack is attached to the ring and an egress subrack is attached to the ring. Such example scenario is shown in FIG. 11, wherein subrack $22_{R0}$ serves as the ingress subrack and subrack $22_{R2}$ serves as the egress subrack, both subrack $22_{R0}$ and subrack $22_{R2}$ being connected to ring R. Each subrack is connected to ring R over a SILI (SPAS Internal Link Interface) interface 23R. The SILI 23R is connected as a closed ring connecting from subrack to subrack. The physical wires of ring R are bidirectional in the illustrated embodiment, but it should be understood that unidirectional wires can also be employed.

Figures 13E, 13F:
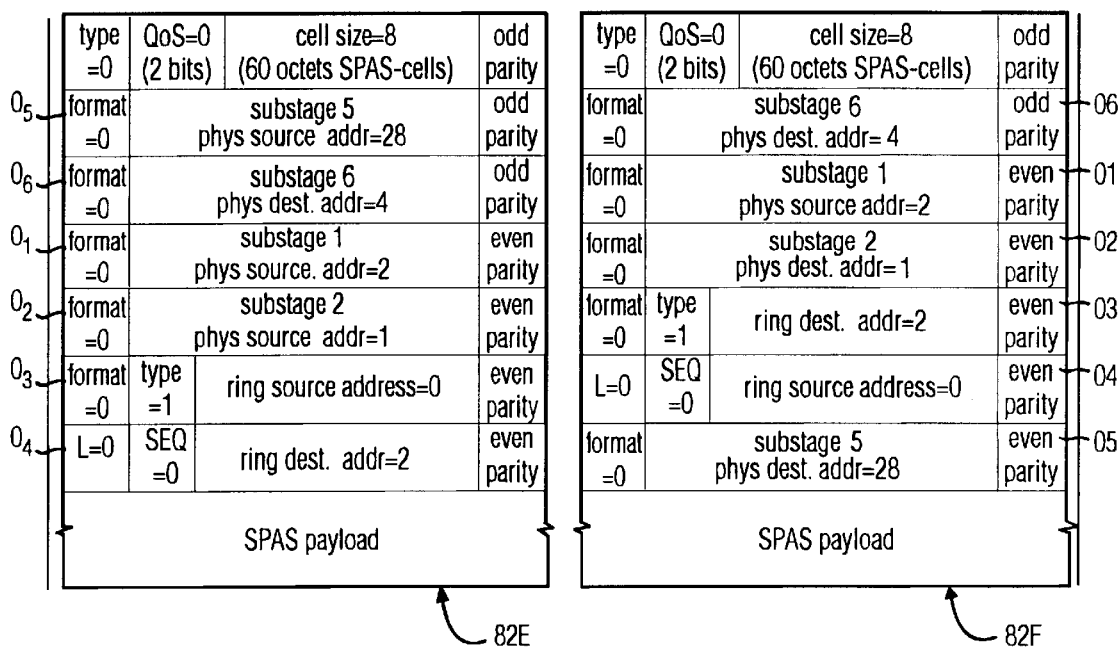

In the example scenario illustrated in FIG. 11, and also depicted with reference to FIG. 13A–FIG. 13F, a SPAS cell is to be sent from SPIM #2 (i.e., SPIM $26_{R0-1}$) on subrack $22_{R0}$ to address adr=4 (which is connected to SPIM #5 on subrack $22_{R2}$). FIG. 11 shows six specific points of travel, particularly points A–F for such SPAS cell. The SPAS tag 82 for travel point A is shown in FIG. 13A; the SPAS tag 82 for travel point B is shown in FIG. 13B; and so forth. Therefore, FIG. 13A–FIG. 13F are referenced in the ensuing detailed description of the travel of the cell from point A (SPIM #2) to point F (the device having adr=4). Since the octets of SPAS tag 82 are popped in revolving fashion, the first substage octet is referenced as octet O1, the second substage octet as O2, and so forth.

At point A in FIG. 11, the SPAS tag 82 is as shown in FIG. 13A. Thus, SPAS tag 82 has its middle two octets (O3 and O4) of the transfer list in the form of the octet pair 1200 mentioned above (see FIG. 12). After the cell leaves point A, core $24_{R0}$ routes the cell to SPIM #0 of subrack $22_{R0}$ at address adr=0. In so doing, core $24_{R0}$ substitutes the source address (the address of SPIM #2) for the destination address in the top octet (octet O1) of transfer list 88.

When the cell reaches ingress to SPIM #0, the SPIM #0 changes the parity of the top octet (octet O1) of transfer list 88 from odd to even parity and then pops the top octet (octet O1) from the top of transfer list 88 to the bottom of transfer list 88. Thus, at point B (inside SPIM #0), the SPAS tag 82 appears as in FIG. 13B. The SPIM #0 looks at the then uppermost octet (octet O2) in the transfer list 88, and determines therefrom that the next physical destination address is adr=1. The physical destination address adr=1 is the address of ring R. It should be kept in mind that, although unillustrated, several other rings could be connected to SPIM #0 (or any other SPIM, for that matter). SPIM #0 substitutes its address in the top octet (octet O2) of transfer list 88 for the destination address, changes the parity, and then pops the top octet (octet O2) of transfer list 88, so that octet O2 is goes to the bottom of transfer list 88 as shown in FIG. 13C.

The cell with SPAS tag 82 as shown in FIG. 13C travels on ring R until it is accepted by the subrack identified by the destination address field in the top of the transfer list 88. The travel on ring R is represented as point C in FIG. 11. In subrack $22_{R1}$ the cell is transferred transparently through its core $24_{R1}$, since the format and type code in octet pair 1200 indicate that core $24_{R1}$ is not to touch the cell.

When the cell reaches its ring destination address at SPIM #28, which is at ring address 2 (being subrack $22_{R2}$), the cell is accepted by SPIM #28. Moreover, SPIM #28 changes the parity from odd to even of the octet pair 1200 at the top of transfer list 88, e.g., octets O3 and O4, and pops the octet pair 1200 from the top to the bottom of transfer list 88. Therefore, at point D as the cell enters core $24_{R2}$ from SPIM #28, the SPAS tag 82 appears as in FIG. 13D.

Core $24_{R2}$ exchanges the contents of the ring destination address and the ring source address fields 1206 and 1214 of the octet pair 1200 at the bottom of transfer list 88, e.g., octets O3 and O4. After the exchange, at point E the SPAS tag 82 has the appearance shown in FIG. 13E. Then core 24$_{R2}$ delivers the cell to the address of the target SPIM #5, e.g., adr=5, which now appears in the uppermost octet (octet O5) of transfer list 88.

The target SPIM #5 puts the uppermost octet (octet O5) at the bottom of the transfer list 88, and changes the parity from odd to even. The target SPIM #5 then transfers the cell, with its SPAS tag 82 at point F appearing as in FIG. 13F, to the addressed application (e.g., the device having adr=4).

Thus, the foregoing describes the routing of a cell through a multi-stage ATM node 20 having a ring topology, and shows the use of octet pair 1200 as well as the popping of octets in transfer list 88 (which is common to all topologies). Thus, the SPAS tag 82 of the present invention accommodates a multi-stage ATM node 20 having a ring or bus topology.

Figure 15:
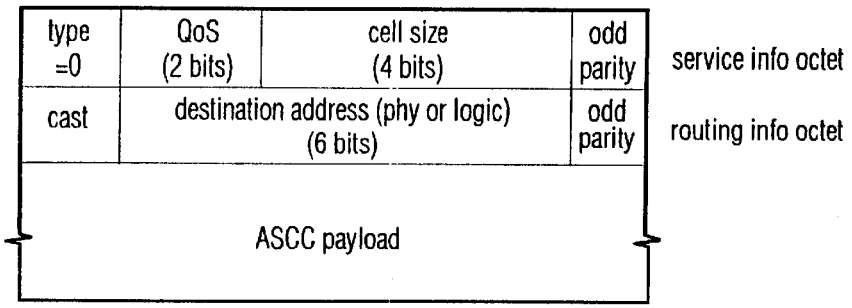
FIG. 15 is a diagrammatic view of routing information octet for a traffic cell.

The SPAS tag 82 of the present invention also allows for multicasting or broadcasting of traffic cells. Whether a cell is a traffic cell is determined by the type field of the service information octet 86 (see FIG. 4 and the description thereof). For a traffic cell, the format field of each octet of payload 84 is interpreted as being a cast field (see FIG. 15). The cast field indicates whether (1) the cell is unicast, e.g., the destination address is binary encoded [when the value in cast field is 0], or (2) whether the cell is to be broadcast or multicast. If the cast field indicates multicast or broadcast, the destination address is logical and is interpreted in accordance with Table 4.

TABLE 4

DESTINATION FIELD INTERPRETATION IN TRANSFER LIST FOR TRAFFIC CELLS

| Destination Field Value | Significance |
|---|---|
| 0 | broadcast on not occupied crosspoints |
| 1 | broadcast, all crosspoints loaded regardless of previous state |
| 2 | multicast table 1, full multicast table |
| 3 | multicast table 2, limited multicast table |
| 4 | multicast table 3, limited multicast table |
| 5–30 | Reserved for limited multicast connections |
| 31 | Indicates "null"; the cell shall be terminated if it has reached this far. |
| 32–63 | Reserved for ring topology (the core routes the cell to the address stated in the predefined register or to the source, the routing information octet is not changed) |

While the present description has utilized an example of multi-stage ATM node having as many as six stages through which an SPAS cell can travel, and consequently a transfer list 88 of six octets, it should be understood that the principles of the invention are not limited to this particular example. Rather, a greater or lesser number of stages may be present in multi-stage ATM node 20, and consequently the length of transfer list 88 is also variable.

Similarly, other parameters described herein are not critical but instead can assume other values in other embodiments. For example, the size of a SPAS performance monitoring control cell as being thirty octets is just one illustrative but variable parameter. In the same vein, if the SILI interface 23 and the SAI interface are present at the same SPIM, the address field of an octet of transfer list 88 can be divided.

In the illustrations provided herewith, e.g., FIG. 5 and FIG. 5A–FIG. 5D, cell travel has been depicted as from right to left. The reader will appreciate, however, that cells are also traveling from left to right, and that such cells are also routed and monitored in accordance with the principles of the invention.

The reader will also understand that times are required, e.g., at the various SPIMs, in order to make the performance monitoring procedure robust, e.g., for the signals requiring a response a local timer is set. The provision and use of timers is well within the ken of the person skilled in the art.

The present invention provides an advantageous method for performance monitoring of a multi-staged ATM node. Any connection through the node, or segments thereof, can be monitored in order to detect, e.g., early degradation in performance.

The present invention is both scalable and upgradable. Moreover, the performance monitoring capabilities described herein can be introduced in part of gradually, if desired. For example, the hardware employed can be designed at low cost if desired to handle only one active segment start or end point at a time. Subsequent versions can be used to handle a multitude of segments simultaneously.

The advantages of using the routing tag (e.g., SPAS tag 82) of the invention are manifold. In particular, no VPI/VCI conversion is performed for routing the ATM cell through plural stages of multi-stage ATM node 20 subsequent to the appending of the routing tag. The number of internal control paths is also reduced, and connection set up time is shortened. Such is attributable, e.g., to the fact that mapping between VPI/NVCI values is not necessary on internal links within multi-stage ATM node 20. The superiority of the internal routing of the present invention, as represented by FIG. 10B, is understood, e.g., with reference to an alternative technique shown in FIG. 10A. In FIG. 10A, for sake of simplicity extension terminals (ETs) are shown as connected to the switch cores 24, rather than the entire device boards 30 with switch port interface modules (SPIMs) 26. FIG. 10A shows an alternative technique in which VPI/NVCI conversion is performed between each of three subracks, particular subrack A, subrack B, and subrack C.

The routing tag of the invention can be utilized in other implementations, and can be used as a token and passed on to the next node in a chain or in a ring if no match is detected. In such case the tag that is passed on may be extended with a node address. In such case, extension terminals (ETs) must be setup in advance in order to know where to pass the cell if no match is detected.

While the invention has been described in connection with what is presently. considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An ATM node comprising
   plural ATM switches connected together;
   a connection setup manager which appends a tag to a cell routed through the ATM node, the tag comprising a list of destination addresses for routing of the cell through the ATM node;
   a node performance monitoring manager which defines a segment of monitored cell travel through the plural ATM switches of the ATM node, and which activates a tag-utilizing performance monitoring over the defined segment.

2. The apparatus of claim 1, wherein the node performance monitoring manager activates performance monitoring from an originating end of the segment to a terminating end of the segment, and wherein the node further comprises a terminating monitoring unit at a terminating end of the segment which uses the tag of a received cell to determine whether the received cell is subject to performance monitoring, and which prepares a termination unit report regarding cells which are subject to performance monitoring.

3. The apparatus of claim 1, wherein each of the plural ATM switches has a switch core situated between two switch port interface modules.

4. The apparatus of claim 3, wherein the originating end of the segment resides at one of the switch port interface modules of the node and the terminating end of the segment resides at another of the switch port interface modules of the node.

5. The apparatus of claim 1, wherein the ATM node further comprises a traffic control manager which inserts a quality of service indicator into the tag of the cell.

6. The apparatus of claim 1, wherein the tag comprising a list of six destination addresses for switching of the cell through the ATM node.

7. The apparatus of claim 1, wherein the node performance monitoring manager causes insertion of a code in the tag of a control cell to indicate whether monitoring start or monitoring stop is to be performed with respect to one or more of the destination addresses listed in the tag.

8. The apparatus of claim 7, wherein for each of plural destination addresses in the tag, the tag selectively includes a code inserted by the node performance monitoring manager to indicate whether monitoring is to start or begin with respect to a segment bounded by the associated destination address.

9. The apparatus of claim 1, wherein the node performance monitoring manager causes monitoring management cells to be transmitted between an originating end of the segment and a terminating end of the segment.

10. The apparatus of claim 9, wherein at least one of the monitoring management cells is a monitoring activation cell which is sent from the originating end of the segment to notify the terminating end that performance monitoring has been activated.

11. The apparatus of claim 9, wherein the monitoring activation cell specifies a destination address which is involved in the performance monitoring.

12. The apparatus of claim 11, wherein the monitoring activation cell further specifies a certain quality of service which is involved in the performance monitoring.

13. The apparatus of claim 9, wherein at least one of the monitoring management cells is a response cell which is sent from the terminating end of the segment to confirm to the originating end that the terminating end is ready for performance monitoring.

14. The apparatus of claim 9, wherein at least one of the monitoring management cells is a monitoring result cell which is sent from the terminating end of the segment to the originating end and which includes monitoring data.

15. The apparatus of claim 14, wherein the monitoring data is one of cell count and total checksum.

16. An ATM node comprising
plural ATM switches connected together;
a connection setup manager which appends a tag to a cell routed through the ATM node, the tag comprising a list of destination addresses for routing of the cell through the ATM node;
a node performance monitoring manager which defines one or more segments of monitored cell travel through the plural ATM switches of the ATM node, and selectively starts and stops a tag-utilizing performance monitoring over the one or more segments by including in the tag of selective cells a code which indicates whether monitoring is to start or stop with respect to the one or more segments.

17. The apparatus of claim 16, further comprising a terminating monitoring unit at a terminating end of the segment which uses the tag of a received cell to determine whether the received cell is subject to performance monitoring, and which prepares a termination unit report regarding cells which are subject to performance monitoring.

18. The apparatus of claim 16, wherein each of the plural ATM switches has a switch core situated between two switch port interface modules, a link connecting the switch core with one of its switch port interface modules being a stage.

19. The apparatus of claim 18, wherein the originating end of the segment resides at one of the switch port interface modules of the node and the terminating end of the segment resides at another of the switch port interface modules of the node.

20. The apparatus of claim 16, wherein the ATM node further comprises a traffic control manager which inserts a quality of service indicator into the tag of the cell.

21. The apparatus of claim 16, wherein the tag comprising a list of six destination addresses for switching of the cell through the ATM node.

22. The apparatus of claim 16, wherein the node performance monitoring manager causes monitoring management cells to be transmitted between an originating end of the segment and a terminating end of the segment.

23. The apparatus of claim 22, wherein at least one of the monitoring management cells is a monitoring activation cell which is sent from the originating end of the segment to notify the terminating end that performance monitoring has been activated.

24. The apparatus of claim 22, wherein the monitoring activation cell specifies a certain destination address which is involved in the performance monitoring.

25. The apparatus of claim 24, wherein the monitoring activation cell further specifies a certain quality of service which is involved in the performance monitoring.

26. The apparatus of claim 22, wherein at least one of the monitoring management cells is a response cell which is sent from the terminating end of the segment to confirm to the originating end that the terminating end is ready for performance monitoring.

27. The apparatus of claim 22, wherein at least one of the monitoring management cells is a monitoring result cell which is sent from the terminating end of the segment to the originating end and which includes monitoring data.

28. The apparatus of claim 27, wherein the monitoring data is one of cell count and total checksum.

29. A method of operating an ATM node comprised of plural ATM switches connected together, the method comprising:
appending a tag to a cell to be routed through the ATM node, the tag comprising a list of destination addresses for routing of the cell through the ATM node;
defining a segment of monitored cell travel through the plural ATM switches of the ATM node;
activating performance monitoring over the defined segment; and
using the tag of a received cell to determine whether the received cell is subject to performance monitoring.

30. The method of claim 29, further comprising preparing a report regarding cells which are subject to performance monitoring.

31. The method of claim 29, wherein each of the plural ATM switches has a switch core situated between two switch port interface modules.

32. The method of claim 31, wherein an originating end of the segment resides at one of the switch port interface modules of the node and a terminating end of the segment resides at another of the switch port interface modules of the node.

33. The method of claim 29, further comprising inserting a quality of service indicator into the tag of the cell.

34. The method of claim 29, wherein the tag comprising a list of six destination addresses for switching of the cell through the ATM node.

35. The method of claim 29, further comprising inserting, in the tag, a code indicating whether monitoring start or monitoring stop is to be performed with respect to one or more of the destination addresses listed in the tag.

36. The method of claim 35, further comprising selectively inserting, for each of plural destination addresses, a code in the tag of a control cell to indicate whether monitoring is to start or begin with respect to a segment bounded by the associated destination address.

37. The method of claim 29, further comprising transmitting monitoring management cells between an originating end of the segment and a terminating end of the segment.

38. The method of claim 37, further comprising transmitting a monitoring activation cell from the originating end of the segment to notify the terminating end that performance monitoring has been activated.

39. The method of claim 37, further comprising including in the monitoring activation cell a certain destination address which is involved in the performance monitoring.

40. The method of claim 39, further comprising also including in monitoring activation cell further a certain quality of service which is involved in the performance monitoring.

41. The method of claim 37, further comprising transmitting a response cell from the terminating end of the segment to confirm to the originating end that the terminating end is ready for performance monitoring.

42. The method of claim 37, further comprising transmitting a monitoring result cell from the terminating end of the segment to the originating end, the monitoring result cell including monitoring data.

43. The method of claim 42, wherein the monitoring data is one of cell count and total checksum.

44. A method of operating an ATM node comprised of plural ATM switches connected together, the method comprising:
    appending a tag to a cell to be routed through the ATM node, the tag comprising a list of destination addresses for routing of the cell through the ATM node;
    defining one or more segments of monitored cell travel through the plural ATM switches of the ATM node;
    including in the tag a code which indicates whether monitoring is to start or stop with respect to the defined segment; and
    using the tag of a received cell to determine whether the received cell is subject to performance monitoring.

45. The method of claim 44, further comprising preparing a report regarding cells which are subject to performance monitoring.

46. The method of claim 44, wherein each of the plural ATM switches has a switch core situated between two switch port interface modules.

47. The method of claim 46, wherein an originating end of the segment resides at one of the switch port interface modules of the node and a terminating end of the segment resides at another of the switch port interface modules of the node.

48. The method of claim 44, further comprising inserting a quality of service indicator into the tag of the cell.

49. The method of claim 44, wherein the tag comprising a list of six destination addresses for switching of the cell through the ATM node.

50. The method of claim 44, further comprising transmitting monitoring management cells between an originating end of the segment and a terminating end of the segment.

51. The method of claim 50, further comprising transmitting a monitoring activation cell from the originating end of the segment to notify the terminating end that performance monitoring has been activated.

52. The method of claim 50, further comprising including in the monitoring activation cell a certain destination address which is involved in the performance monitoring.

53. The method of claim 50, further comprising also including in monitoring activation cell further a certain quality of service which is involved in the performance monitoring.

54. The method of claim 50, further comprising transmitting a response cell from the terminating end of the segment to confirm to the originating end that the terminating end is ready for performance monitoring.

55. The method of claim 50, further comprising transmitting a monitoring result cell from the terminating end of the segment to the originating end, the monitoring result cell including monitoring data.

56. The method of claim 55, wherein the monitoring data is one of cell count and total checksum.

57. An ATM node comprising
    plural ATM switches connected together;
    a connection setup manager which appends a tag to a cell routed through the ATM node, the tag comprising a list of destination addresses for routing of the cell through the ATM node;
    a node performance monitoring manager which defines a segment of monitored cell travel through the plural ATM switches of the ATM node, and which activates a tag-utilizing performance monitoring over the defined segment, the performance monitoring being monitoring of a block of data carried between a start cell and a stop cell in a stream of cells transmitted over the defined segment.

58. The apparatus of claim 57, wherein the node performance monitoring manager activates performance monitoring from an originating end of the segment to a terminating end of the segment, and wherein the node further comprises a terminating monitoring unit at a terminating end of the segment which uses the tag of a received cell to determine whether the received cell is subject to performance monitoring, and which prepares a termination unit report regarding cells which are subject to performance monitoring.

59. The apparatus of claim 57, wherein the node performance monitoring manager causes insertion of a code in the tag of a control cell to indicate whether monitoring start or monitoring stop is to be performed with respect to one or more of the destination addresses listed in the tag.

60. The apparatus of claim 59, wherein for each of plural destination addresses in the tag, the tag selectively includes a code inserted by the node performance monitoring manager to indicate whether monitoring is to start or begin with respect to a segment bounded by the associated destination address.

61. The apparatus of claim 57, wherein the monitoring comprises determining one of cell count and total checksum of the block.

62. A method of operating an ATM node comprised of plural ATM switches connected together, the method comprising:
   appending a tag to a cell to be routed through the ATM node, the tag comprising a list of destination addresses for routing of the cell through the ATM node;
   defining a segment of monitored cell travel through the plural ATM switches of the ATM node;
   activating performance monitoring over the defined segment; and
   using the tag of a received cell to determine whether the received cell is subject to performance monitoring, the performance monitoring being monitoring of a block of data carried between a start cell and a stop cell in a stream of cells transmitted over the defined segment.

63. The method of claim 62, further comprising inserting, in the tag, a code indicating whether monitoring start or monitoring stop is to be performed with respect to one or more of the destination addresses listed in the tag.

64. The method of claim 63, further comprising selectively inserting, for each of plural destination addresses, a code in the tag of a control cell to indicate whether monitoring is to start or begin with respect to a segment bounded by the associated destination address.

65. The apparatus of claim 62, wherein the monitoring comprises determining one of cell count and total checksum of the block.

* * * * *